United States Patent
Mundy et al.

(10) Patent No.: US 8,798,777 B2
(45) Date of Patent: Aug. 5, 2014

(54) SYSTEM AND METHOD FOR USING A LIST OF AUDIO MEDIA TO CREATE A LIST OF AUDIOVISUAL MEDIA

(75) Inventors: L. Starlight Mundy, San Diego, CA (US); Dann Wilkens, Cardiff, CA (US); Christina Sanini, San Diego, CA (US); Ralph Neff, San Diego, CA (US); Joel Rolfe, Fort Mill, SC (US)

(73) Assignee: Packetvideo Corporation, San Diego, CA (US)

( * ) Notice: Subject to any disclaimer, the term of this patent is extended or adjusted under 35 U.S.C. 154(b) by 819 days.

(21) Appl. No.: 12/932,882

(22) Filed: Mar. 8, 2011

(65) Prior Publication Data

US 2012/0232681 A1    Sep. 13, 2012

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS

| | | |
|---|---|---|
| 4,751,578 A | 6/1988 | Reiter et al. |
| 5,473,691 A | 12/1995 | Menezes et al. |
| 5,666,530 A | 9/1997 | Clark et al. |
| 5,790,848 A | 8/1998 | Wlaschin |
| 5,819,047 A | 10/1998 | Bauer et al. |
| 5,862,325 A | 1/1999 | Reed et al. |
| 5,937,038 A | 8/1999 | Bell et al. |
| 5,956,729 A | 9/1999 | Goetz et al. |
| 5,978,014 A | 11/1999 | Martin et al. |
| 6,141,682 A | 10/2000 | Barker |
| 6,161,132 A | 12/2000 | Roberts et al. |
| 6,167,092 A | 12/2000 | Lengwehasatit |
| 6,175,856 B1 | 1/2001 | Riddle |
| 6,182,287 B1 | 1/2001 | Schneidewend et al. |
| 6,304,969 B1 | 10/2001 | Wasserman et al. |
| 6,356,971 B1 | 3/2002 | Katz et al. |
| 6,407,680 B1 | 6/2002 | Lai et al. |
| 6,429,812 B1 | 8/2002 | Hoffberg |
| 6,498,865 B1 | 12/2002 | Brailean et al. |
| 6,529,552 B1 | 3/2003 | Tsai et al. |
| 6,647,269 B2 | 11/2003 | Hendrey et al. |
| 6,665,751 B1 | 12/2003 | Chen et al. |
| 6,697,564 B1 * | 2/2004 | Toklu et al. ................... 386/285 |
| 6,742,028 B1 | 5/2004 | Wang et al. |
| 6,804,717 B1 | 10/2004 | Bakshi et al. |
| 6,826,272 B1 | 11/2004 | Dalrymple et al. |
| 6,856,612 B1 | 2/2005 | Bjelland et al. |
| 6,865,600 B1 | 3/2005 | Brydon et al. |
| 6,941,324 B2 | 9/2005 | Plastina et al. |
| 7,006,631 B1 | 2/2006 | Luttrell |
| 7,013,149 B2 | 3/2006 | Vetro |

(Continued)

*Primary Examiner* — Paul McCord
(74) *Attorney, Agent, or Firm* — Patents+TMS, P.C.

(57) ABSTRACT

A system and a method use a list of audio media to create a list of audiovisual media. A user of a computing device may create, may access, may edit and/or may use a list of audio media objects, such as, for example, an audio playlist. The the user may request generation of a list of audiovisual media objects which correspond to the audio media objects in the list of audio media objects. The user may request generation of the list of audiovisual media objects using a user interface on the computing device. The list of audio media objects may be provided to a list conversion engine which may discover, create, and/or obtain audiovisual media objects which correspond to the audio media objects in the list of audio media objects.

36 Claims, 5 Drawing Sheets

(56) References Cited

U.S. PATENT DOCUMENTS

| | | |
|---|---|---|
| 7,107,017 B2 | 9/2006 | Koskelainen et al. |
| 7,139,279 B2 | 11/2006 | Jabri et al. |
| 7,328,030 B2 | 2/2008 | Laursen et al. |
| 7,493,106 B2 | 2/2009 | Espelien |
| 7,519,686 B2 | 4/2009 | Hong et al. |
| 7,634,076 B2 | 12/2009 | Lee et al. |
| 7,676,591 B2 | 3/2010 | Chan et al. |
| 7,680,490 B2 | 3/2010 | Bloebaum et al. |
| 7,808,988 B2 | 10/2010 | Neff |
| 2001/0030959 A1 | 10/2001 | Ozawa et al. |
| 2002/0002044 A1 | 1/2002 | Naruse et al. |
| 2002/0016195 A1 | 2/2002 | Namba et al. |
| 2002/0042923 A1 | 4/2002 | Asmussen et al. |
| 2002/0129359 A1 | 9/2002 | Lichner |
| 2002/0131496 A1 | 9/2002 | Vasudevan et al. |
| 2002/0181495 A1 | 12/2002 | Requena et al. |
| 2002/0184195 A1 | 12/2002 | Qian |
| 2003/0009518 A1 | 1/2003 | Harrow et al. |
| 2003/0048855 A1 | 3/2003 | Klaghofer et al. |
| 2003/0067872 A1 | 4/2003 | Harrell et al. |
| 2003/0078061 A1 | 4/2003 | Kim |
| 2003/0093267 A1 | 5/2003 | Leichtling et al. |
| 2003/0110503 A1 | 6/2003 | Perkes |
| 2003/0115069 A1 | 6/2003 | Pence et al. |
| 2003/0115150 A1 | 6/2003 | Hamilton et al. |
| 2003/0140343 A1 | 7/2003 | Falvo et al. |
| 2003/0142744 A1 | 7/2003 | Wu et al. |
| 2003/0142751 A1 | 7/2003 | Hannuksela |
| 2003/0219006 A1 | 11/2003 | Har |
| 2003/0229900 A1 | 12/2003 | Reisman |
| 2003/0233399 A1 | 12/2003 | Prohel et al. |
| 2004/0015989 A1 | 1/2004 | Kaizu et al. |
| 2004/0068536 A1 | 4/2004 | Demers et al. |
| 2004/0070678 A1 | 4/2004 | Toyama et al. |
| 2004/0077313 A1 | 4/2004 | Oba et al. |
| 2004/0078807 A1 | 4/2004 | Fries et al. |
| 2004/0088369 A1 | 5/2004 | Yeager |
| 2004/0098447 A1 | 5/2004 | Verbeke et al. |
| 2004/0110464 A1 | 6/2004 | Perlman |
| 2004/0111755 A1 | 6/2004 | Perlman |
| 2004/0116067 A1 | 6/2004 | Karaoguz et al. |
| 2004/0128396 A1 | 7/2004 | Patrick et al. |
| 2004/0139468 A1 | 7/2004 | Kidd |
| 2004/0158645 A1 | 8/2004 | Morinaga et al. |
| 2004/0172478 A1 | 9/2004 | Jacobs et al. |
| 2004/0174817 A1 | 9/2004 | Jabri et al. |
| 2004/0193762 A1 | 9/2004 | Leon et al. |
| 2004/0210935 A1 | 10/2004 | Schein et al. |
| 2004/0218673 A1 | 11/2004 | Wang et al. |
| 2004/0243694 A1 | 12/2004 | Weast |
| 2004/0255029 A1 | 12/2004 | Manion et al. |
| 2005/0008030 A1 | 1/2005 | Hoffman et al. |
| 2005/0028208 A1 | 2/2005 | Ellis et al. |
| 2005/0047448 A1 | 3/2005 | Lee et al. |
| 2005/0085296 A1 | 4/2005 | Gelb et al. |
| 2005/0086606 A1 | 4/2005 | Blennerhassett et al. |
| 2005/0086696 A1 | 4/2005 | Daniels |
| 2005/0095981 A1 | 5/2005 | Benco |
| 2005/0097595 A1 | 5/2005 | Lipsanen et al. |
| 2005/0138193 A1 | 6/2005 | Encarnacion et al. |
| 2005/0182791 A1 | 8/2005 | Lim et al. |
| 2005/0228830 A1 | 10/2005 | Plastina et al. |
| 2005/0239547 A1 | 10/2005 | Haga et al. |
| 2005/0246451 A1 | 11/2005 | Silverman et al. |
| 2005/0288991 A1 | 12/2005 | Hubbard et al. |
| 2006/0002681 A1 | 1/2006 | Spilo et al. |
| 2006/0008256 A1 | 1/2006 | Khedouri et al. |
| 2006/0010472 A1 | 1/2006 | Godeny |
| 2006/0013148 A1 | 1/2006 | Burman et al. |
| 2006/0029041 A1 | 2/2006 | Jabri et al. |
| 2006/0031883 A1 | 2/2006 | Ellis et al. |
| 2006/0036554 A1 | 2/2006 | Schrock et al. |
| 2006/0047952 A1 | 3/2006 | Van Den Heuvel et al. |
| 2006/0053080 A1 | 3/2006 | Edmonson et al. |
| 2006/0056336 A1 | 3/2006 | Dacosta |
| 2006/0056416 A1 | 3/2006 | Yang et al. |
| 2006/0095792 A1 | 5/2006 | Hurtado et al. |
| 2006/0101499 A1 | 5/2006 | Aravamudan et al. |
| 2006/0117379 A1 | 6/2006 | Bennett et al. |
| 2006/0133391 A1 | 6/2006 | Kang et al. |
| 2006/0143295 A1 | 6/2006 | Costa-Requena et al. |
| 2006/0146854 A1 | 7/2006 | Park |
| 2006/0159037 A1 | 7/2006 | Jabri et al. |
| 2006/0161635 A1 | 7/2006 | Lamkin et al. |
| 2006/0168342 A1 | 7/2006 | Budde et al. |
| 2006/0176877 A1 | 8/2006 | Jabri et al. |
| 2006/0195514 A1 | 8/2006 | Rogers et al. |
| 2006/0195790 A1 | 8/2006 | Beaupre et al. |
| 2006/0218642 A1 | 9/2006 | Kuppusamy et al. |
| 2006/0221190 A1 | 10/2006 | Limberis et al. |
| 2006/0242325 A1 | 10/2006 | Ramaswamy et al. |
| 2006/0259575 A1 | 11/2006 | Upendran et al. |
| 2006/0277565 A1 | 12/2006 | Long et al. |
| 2006/0288071 A1 | 12/2006 | Bigioi et al. |
| 2006/0288112 A1 | 12/2006 | Soelberg et al. |
| 2006/0294572 A1 | 12/2006 | Walter |
| 2007/0005727 A1 | 1/2007 | Edwards et al. |
| 2007/0011277 A1 | 1/2007 | Neff et al. |
| 2007/0027808 A1 | 2/2007 | Dooley et al. |
| 2007/0033225 A1 | 2/2007 | Davis |
| 2007/0047816 A1 | 3/2007 | Graham et al. |
| 2007/0049333 A1 | 3/2007 | Jeong et al. |
| 2007/0061363 A1 | 3/2007 | Ramer et al. |
| 2007/0076711 A1 | 4/2007 | Shuster |
| 2007/0076756 A1 | 4/2007 | Chan et al. |
| 2007/0093275 A1 | 4/2007 | Bloebaum et al. |
| 2007/0101024 A1 | 5/2007 | Doumuki et al. |
| 2007/0112935 A1 | 5/2007 | Espelien |
| 2007/0116036 A1 | 5/2007 | Moore |
| 2007/0118873 A1* | 5/2007 | Houh et al. ............... 725/136 |
| 2007/0130210 A1 | 6/2007 | Park |
| 2007/0136778 A1 | 6/2007 | Birger et al. |
| 2007/0143806 A1 | 6/2007 | Pan |
| 2007/0156770 A1 | 7/2007 | Espelien |
| 2007/0157234 A1 | 7/2007 | Walker |
| 2007/0162571 A1 | 7/2007 | Gupta et al. |
| 2007/0167236 A1 | 7/2007 | Heckendorf, III et al. |
| 2007/0171841 A1 | 7/2007 | Witzel et al. |
| 2007/0186003 A1 | 8/2007 | Foster et al. |
| 2007/0189275 A1 | 8/2007 | Neff |
| 2007/0220561 A1 | 9/2007 | Girardeau et al. |
| 2007/0226315 A1 | 9/2007 | Espelien |
| 2007/0233701 A1 | 10/2007 | Sherwood et al. |
| 2007/0239820 A1 | 10/2007 | Zhong et al. |
| 2007/0239821 A1 | 10/2007 | Huettner et al. |
| 2007/0245399 A1 | 10/2007 | Espelien |
| 2007/0255809 A1 | 11/2007 | Chiba |
| 2007/0264989 A1 | 11/2007 | Palakkal et al. |
| 2007/0266047 A1 | 11/2007 | Cortes et al. |
| 2007/0271388 A1 | 11/2007 | Bowra et al. |
| 2007/0276864 A1 | 11/2007 | Espelien |
| 2007/0282907 A1 | 12/2007 | Chambers |
| 2007/0288478 A1 | 12/2007 | Dimaria et al. |
| 2007/0297352 A1 | 12/2007 | Jabri et al. |
| 2007/0297427 A1 | 12/2007 | Cho et al. |
| 2008/0021952 A1 | 1/2008 | Molinie et al. |
| 2008/0022003 A1 | 1/2008 | Alve |
| 2008/0027808 A1 | 1/2008 | Wilf |
| 2008/0034029 A1 | 2/2008 | Fang et al. |
| 2008/0037489 A1 | 2/2008 | Yitiz et al. |
| 2008/0039967 A1 | 2/2008 | Sherwood et al. |
| 2008/0050096 A1 | 2/2008 | Ryu |
| 2008/0052348 A1 | 2/2008 | Adler et al. |
| 2008/0090590 A1 | 4/2008 | Espelien |
| 2008/0092054 A1 | 4/2008 | Bhumkar et al. |
| 2008/0126543 A1 | 5/2008 | Hamada et al. |
| 2008/0154696 A1 | 6/2008 | Spiegelman et al. |
| 2008/0235733 A1 | 9/2008 | Heie et al. |
| 2008/0250061 A1 | 10/2008 | Kim |
| 2008/0301280 A1 | 12/2008 | Chasen et al. |
| 2009/0019058 A1 | 1/2009 | Jung et al. |
| 2009/0044225 A1 | 2/2009 | Lin et al. |
| 2009/0052380 A1 | 2/2009 | Espelien |
| 2009/0070344 A1 | 3/2009 | Espelien |

(56) References Cited

U.S. PATENT DOCUMENTS

| | | |
|---|---|---|
| 2009/0083803 A1 | 3/2009 | Al-Shaykh et al. |
| 2009/0119766 A1 | 5/2009 | Huetter et al. |
| 2009/0125609 A1 | 5/2009 | Wood et al. |
| 2009/0138922 A1 | 5/2009 | Thomas et al. |
| 2009/0150480 A1 | 6/2009 | Xia et al. |
| 2009/0156182 A1 | 6/2009 | Jenkins et al. |
| 2009/0157680 A1 | 6/2009 | Crossley et al. |
| 2009/0193452 A1 | 7/2009 | Russ et al. |
| 2009/0193469 A1 | 7/2009 | Igarashi |
| 2009/0205003 A1 | 8/2009 | Benyamin |
| 2009/0232220 A1 | 9/2009 | Neff et al. |
| 2009/0234878 A1 | 9/2009 | Herz et al. |
| 2009/0245758 A1* | 10/2009 | Kodama et al. ............... 386/124 |
| 2009/0248702 A1 | 10/2009 | Schwartz et al. |
| 2009/0320077 A1 | 12/2009 | Gazdzinski |
| 2010/0058398 A1 | 3/2010 | Ojala et al. |
| 2010/0070646 A1 | 3/2010 | Chan et al. |
| 2010/0095332 A1 | 4/2010 | Gran et al. |
| 2010/0169778 A1 | 7/2010 | Mundy et al. |
| 2010/0201870 A1 | 8/2010 | Luessi et al. |
| 2010/0305729 A1* | 12/2010 | Glitsch et al. .................. 700/94 |
| 2010/0332565 A1 | 12/2010 | Al-Shaykh et al. |
| 2011/0035373 A1* | 2/2011 | Berg et al. .................... 707/723 |
| 2011/0060998 A1 | 3/2011 | Schwartz et al. |

\* cited by examiner

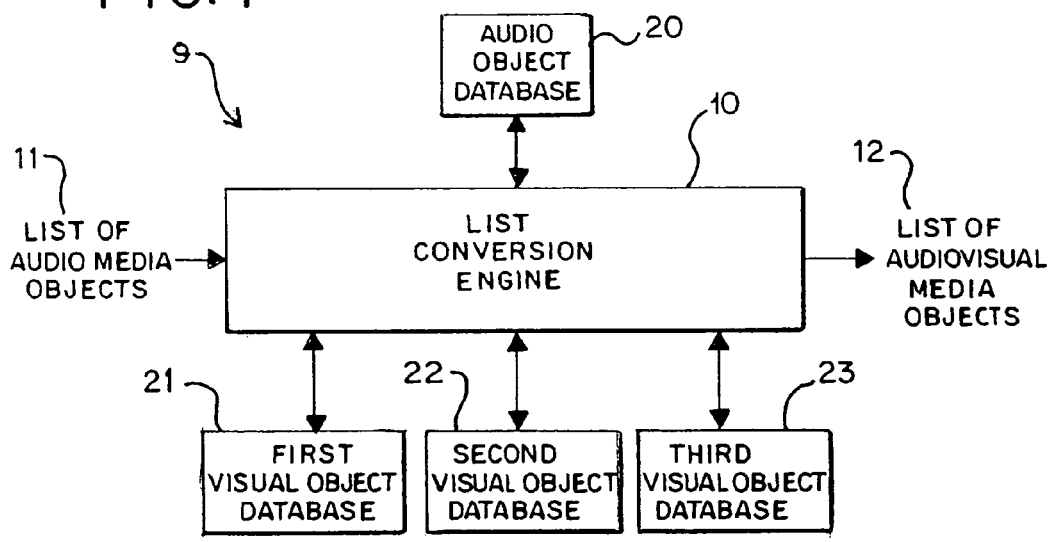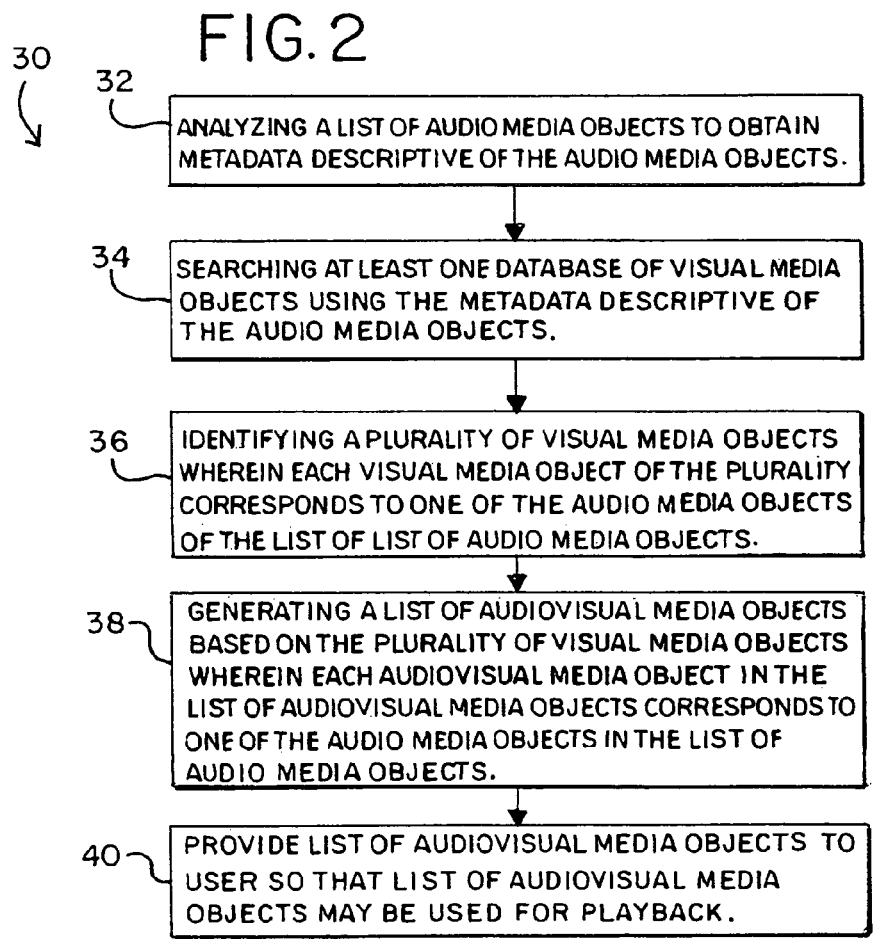

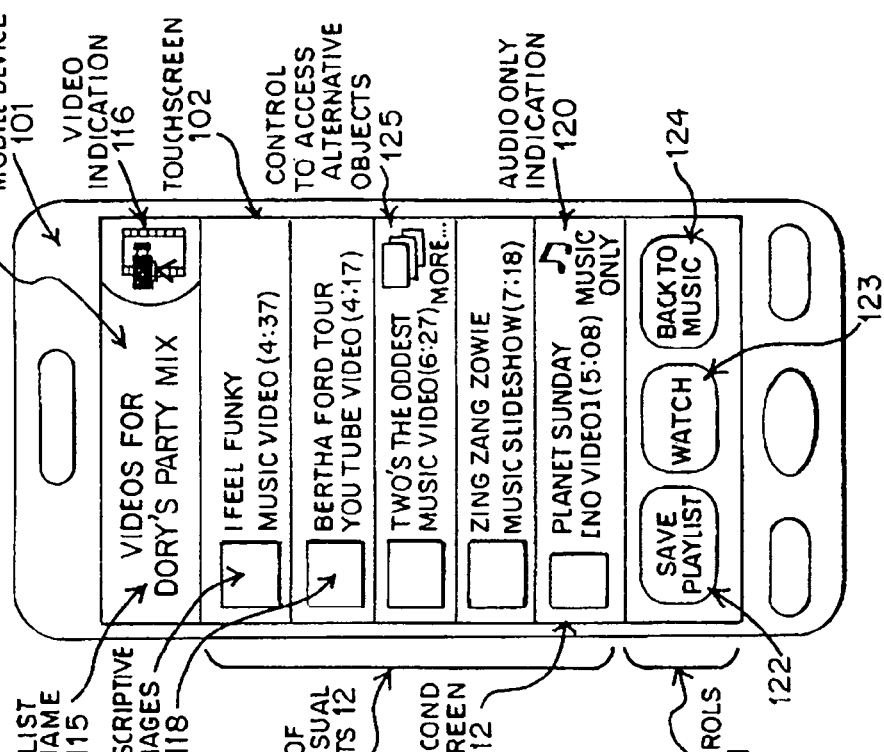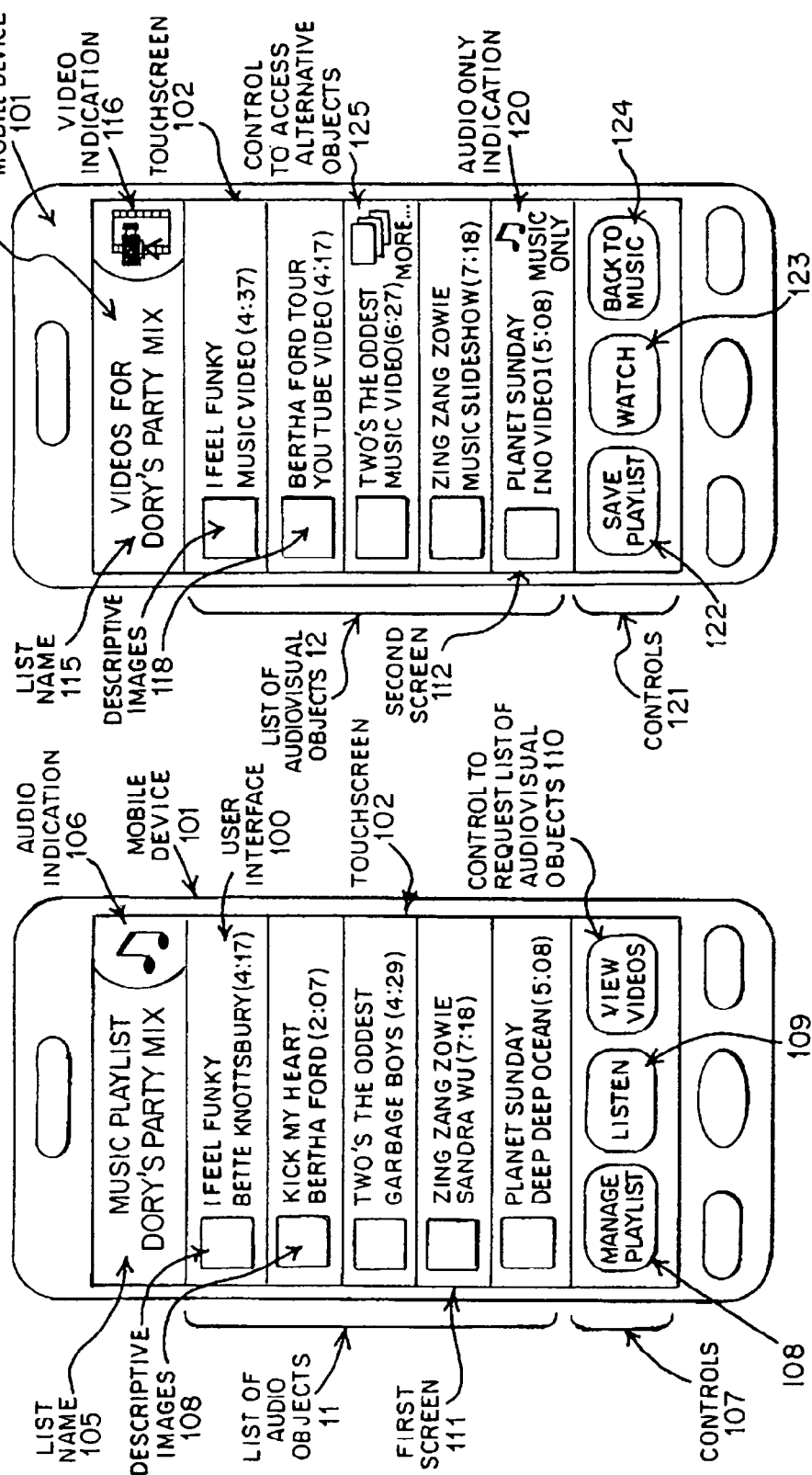

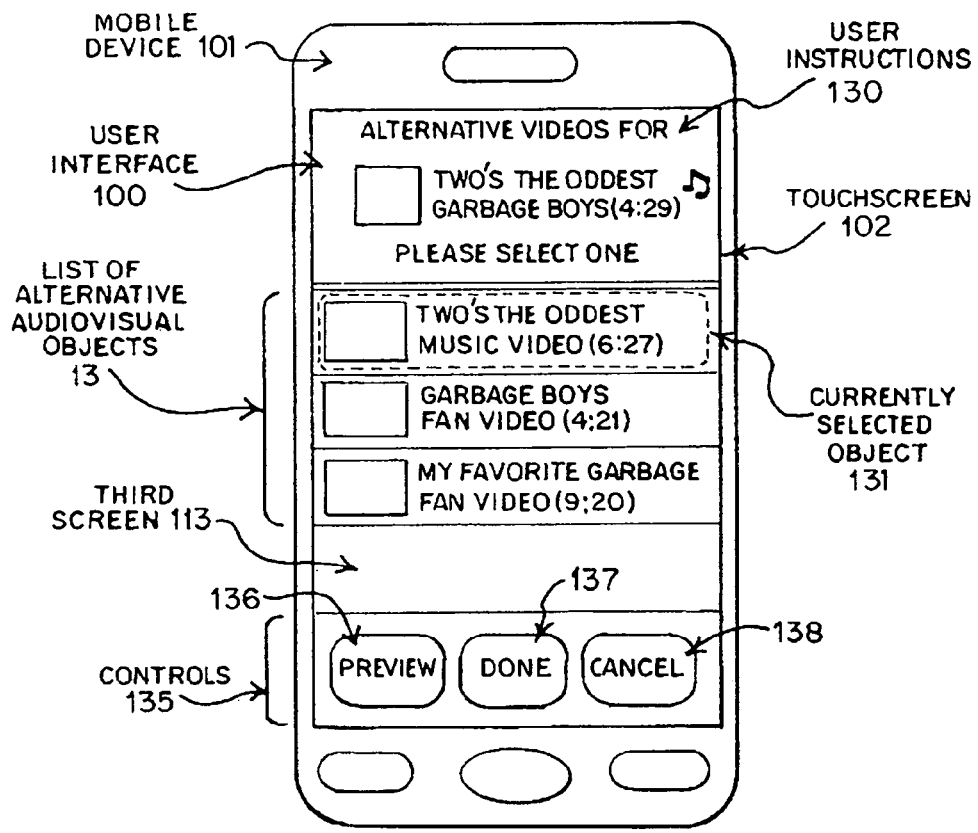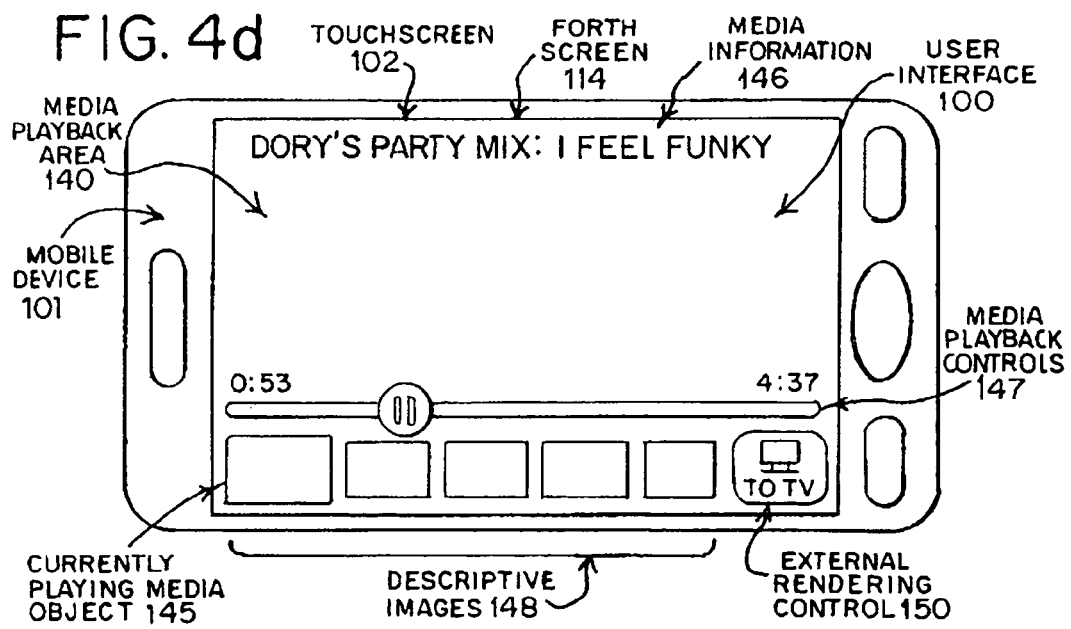

SYSTEM AND METHOD FOR USING A LIST OF AUDIO MEDIA TO CREATE A LIST OF AUDIOVISUAL MEDIA

BACKGROUND OF THE INVENTION

The present invention generally relates to a system and a method for using a list of audio media to create a list of audiovisual media. More specifically, a user of a computing device may create, may access, may edit and/or may use a list of audio media objects, such as, for example, an audio playlist. Then, the user may request generation of a list of audiovisual media objects which correspond to the audio media objects in the list of audio media objects.

A user of modern digital media may discover and may consume digital media content in many different ways and on many different devices. For example, the user may discover and may play music files or streams using an online music service or a music sharing web site. As another example, the user may browse and may play music from a locally stored library of music files using a software music player executed by a personal computer or using a networked playback device, such as a DLNA-compatible stereo device. As yet another example, the user may play digital music files or streams using a mobile device, such as a mobile phone or a dedicated digital music player device. Each of these music playback scenarios has a corresponding scenario for playback of audiovisual content. For example, digital video files and streams may be discovered, may be accessed and may be played using an online video service, a video sharing website, a PC or mobile device equipped with multimedia playback software, or a networked video rendering device, such as a DLNA-compatible television.

For both audio media and audiovisual media, the available solutions often allow the user to organize media objects into lists of media objects. Such lists are called "playlists." A user may create, edit, store, and manage a playlist which references audio media objects or video media objects. Then, the user may play the playlist as a composite object to allow the audio media objects or the video media objects to be played in sequence on an appropriate audio or video rendering device. The rendering device or a separate control device typically allows the user to control the rendering of the playlist. For example, the user may skip forward to the next media object in the playlist, may skip backward to the previous media object in the playlist, or may generate a randomly shuffled order of playback of the media objects in the playlist. As a result, the user may organize favorite media objects into playlists and may use the playlists to play back the media objects in useful ways.

Audio playlists are typically created, edited, and used in the context of a library, a source, and/or a collection of digital audio media objects. For example, a software music player on a personal computer ("PC") may allow a user to create, edit and use an audio playlist based on a library of locally stored music files. For example, the music files may have been previously "ripped" from compact discs or previously downloaded from an online music service. In this example, the existence, the accessibility and/or the use of the playlist may be restricted to the software music player which creates and/or manages the playlist. Alternatively, the software music player may enable the playlist to be exported, stored and/or used outside of the software music player. For example, the playlist may be saved as a playlist file in a well-known format. The saved playlist may be used by other software applications on the PC or may be transferred to and/or used by devices other than the PC.

As another example, an online music site may allow a user to create, edit and use an audio playlist based on the streamable music tracks available through the online music site. The resulting playlist may be managed and/or used with tools provided by the online music site. For example, the tools to create, edit, manage and play the playlist and its associated audio media objects may be embedded in a web page using a scripting language such as Java, Javascript, ECMAscript, or Flash. The existence, accessibility, and/or use of the playlist may be restricted to the online music site and/or the tools provided by the online music site. For example, the online music site may not provide any way for the user to create a portable playlist file which may then be used outside of the online music site. Online music sites typically have such restrictions because use of the provided music content may be limited to the music site due to copyright issues. Playlist.com (www.playlist.com) and Myspace Music (www.myspace.com/music) are two online music services which allow users to create, edit, and use audio playlists based on audio media, mainly music files, available through these services.

In a similar fashion, a software media player may allow a user to create, edit, and use a video playlist. The software media player may allow a user to discover, browse, identify and/or select audiovisual media objects, such as available video files or streams. The software media player may allow the user to include audiovisual media objects in a playlist, and the playlist may then be used to access and/or play back the audiovisual media objects in useful ways. Further, the software media player may allow the user to save, store and/or export the playlist. As a result, the playlist may be used with other software, exported to other devices, or used to share the list of media objects with other users.

Similarly, an online video service may allow a user to create, edit and use a video playlist within the online video service. The online video service may be a news site, a sports site, an educational site, a video sharing site, a social networking site and/or the like. The playlist may be restricted to the online video service. For example, the playlist may be restricted to only reference video media objects available from the online video service. The online video service may not allow the playlist to be exported or shared outside of the online video service. Even so, the online video service may allow the playlist to be shared between users of the online video service.

YouTube (domain at www.youtube.com; trademark of Google Inc.) is an example of a video sharing service which allows users to create video playlists based on the video content available through the service. YouTube also allows users to share the video playlists with other users of the service. Vevo (domain at www.vevo.com; trademark of Polygram Holding, Inc.) is another online video service which allows users to construct playlists from music video content available on the service. Vevo allows users to share their playlists with other users and to access "celebrity" music video playlists which are featured playlists which focus on and/or are provided by a celebrity, such as a popular music artist.

When media software or a media service allows playlists to be saved or exported, a well-known playlist format is typically used. The format may be a binary format, a text format, an XML format and/or the like. For example, the well-known "M3U" playlist format is text-based, and allows media objects to be referenced by an absolute path within a file system, by a relative path within a file system, or by a resource location, such as an HTTP URL. As another example, the Windows Media Player playlist format, also known as "WPL" format, is an XML-based format for defining a playlist.

A user may create, may edit and may use an audio playlist in a software music client or through an online music service. However, the resulting audio playlist is only usable for playing the listed audio media objects. Available audiovisual media objects may correspond to some or all of the audio media objects referenced by the audio playlist. For example, fan videos, informational videos, or professionally produced music videos may correspond to digital music tracks referenced by the audio playlist. The corresponding audiovisual media objects may be available locally or may be available in one or more remote databases accessible to the software music client, the online music service, and/or the user's computing device. The user may prefer viewing of the corresponding audiovisual media objects to merely listening to the audio media objects. However, the user currently has no way to use the audio playlist to discover, access, obtain or use the corresponding audiovisual media objects.

SUMMARY OF THE INVENTION

The present invention generally relates to a system and a method for using a list of audio media to create a list of audiovisual media. More specifically, a user of a computing device may create, may access, may edit and/or may use a list of audio media objects, such as, for example, an audio playlist. Then, the user may request generation of a list of audiovisual media objects which correspond to the audio media objects in the list of audio media objects. For example, the user may request generation of the list of audiovisual media objects using a user interface on the computing device. The list of audio media objects may be provided to a list conversion engine which may discover, create, and/or obtain audiovisual media objects which correspond to the audio media objects in the list of audio media objects.

To this end, in an embodiment of the present invention, a method for using a list of two or more audio media objects to create a list of audiovisual media objects is provided. The method has the steps of analyzing the list of audio media objects to obtain metadata descriptive of the audio media objects; searching one or more visual media object databases using the metadata wherein each of the visual media object databases provides access to visual media objects which encode visual content; identifying a set of visual media objects wherein each of the visual media objects in the set corresponds to one of the audio media objects in the list of audio media objects wherein the set of visual media objects is identified based on the searching step without user input selecting the visual media objects in the set; and using the set of visual media objects to create the list of audiovisual media objects wherein each of the audiovisual media objects referenced by the list of audiovisual media objects corresponds to one of the audio media objects in the list of audio media objects.

In an embodiment, the method has the step of accepting user input on a computing device from a user of the computing device wherein the list of audiovisual media objects is created in response to the user input.

In an embodiment, the method has the steps of playing the audio media objects using the list of audio media objects wherein a user of a computing device controls the playing of the audio media objects using a user interface of the computing device; accepting user input on the computing device wherein the list of audiovisual media objects is created in response to the user input; and playing the audiovisual media objects of the list of audiovisual media objects using a rendering device which is a different device than the computing device wherein the computing device stops playing the audio media objects and instructs the rendering device to begin playing the audiovisual media objects without additional user input requesting playback of the audiovisual media objects subsequent to the user input which prompts creation of the list of audiovisual media objects.

In an embodiment, each of the audio media objects referenced by the list of audio media objects corresponds to one of the audiovisual media objects in the list of audiovisual media objects.

In an embodiment, the step of analyzing the list of audio media objects has the steps of identifying a first audio media object referenced by the list of audio media objects; accessing the first audio media object; and extracting a metadata field from the first audio media object wherein the metadata field is included in the metadata used in the searching step.

In an embodiment, one of the one or more visual media object databases is a database of professionally produced music videos.

In an embodiment, one of the one or more visual media object databases is a video sharing service which provides access to fan videos.

In an embodiment, one of the one or more visual media object databases is a database which provides access to digital photographs uploaded by users.

In an embodiment, the method has the step of using the metadata of a first audio media object referenced by the list of audio media objects to identify a first visual media object and a second visual media object which correspond to the first audio media object wherein the first visual media object is available from a first visual media object database and the second visual media object is available from a second visual media object database wherein the first visual media object is used to create the list of audiovisual media and the second visual media object is not used to create the list of audiovisual media objects based on a predetermined preference for the first visual media object database over the second visual media object database.

In an embodiment, one of the audiovisual media objects in the list of audiovisual media objects is one of the visual media objects in the set of visual media objects.

In an embodiment, each of the audio media objects referenced by the list of audio media objects does not encode visual content.

In an embodiment, the method has the step of obtaining the audiovisual media objects referenced by the list of audiovisual media objects wherein the computing device uses the list of audiovisual media objects to obtain the audiovisual media objects and further wherein the computing device stores the audiovisual media objects on a storage medium after obtaining the audiovisual media objects.

In an embodiment, a first audiovisual media object in the list of audiovisual media objects is obtained from a first content provider and further wherein a second audiovisual media object in the list of audiovisual media objects is obtained from a second content provider which is a different content provider than the first content provider.

In an embodiment, the list of audiovisual media objects is provided to the user of the computing device as a playlist file.

In an embodiment, the method has the steps of displaying the list of audiovisual media objects to a user of a computing device; accepting user input on the computing device after displaying the list of audiovisual media objects; and playing the audiovisual media objects using the list of audiovisual media objects wherein playing the audiovisual media objects is initiated in response to the user input and further wherein playing the audiovisual media objects involves rendering the audiovisual media objects using one of the computing device and an external rendering device.

In an embodiment, the method has the step of using a web page to upload the list of audio media objects to a video media provider located remotely relative to the computing device wherein the video media provider creates the list of audiovisual media objects.

In an embodiment, the method has the step of creating the list of audio media objects using a web page provided by an online content service wherein the online content service uses the list of audio media objects to create the list of audiovisual media objects.

In an embodiment, the method has the step of storing the list of audiovisual media objects in a playlist file having a first audiovisual media object corresponding to a first audio media object referenced by the list of audio media objects wherein an alternative audiovisual media object corresponding to the first audio media object is encoded using comment fields in the playlist file.

In an embodiment, the method has the steps of combining audio content from one of the audio media objects referenced by the list of audio media objects with visual content from at least one of the visual media objects from the set of visual media objects to produce a new audiovisual media object; and including a reference to the new audiovisual media object in the list of audiovisual media objects.

In an embodiment, the audio media objects referenced by the list of audio media objects are digital music tracks.

In an embodiment, the audiovisual media objects referenced by the list of audiovisual media objects are music videos which correspond to the digital music tracks.

In another embodiment of the present invention, a system for using a list of audio media objects to create a list of audiovisual media objects is provided. The system has a computing device which plays audio media objects referenced by the list of audio media objects wherein a user of the computing device inputs a request for creation of the list of audiovisual media objects using a user interface provided by the computing device; a list conversion engine which responds to the request by analyzing the list of audio media objects to obtain metadata descriptive of the audio media objects wherein the list conversion engine uses the metadata to search a visual media object database which provides access to visual media objects which encode visual content; and a set of visual media objects identified by the list conversion engine wherein each of the visual media objects in the set corresponds to one of the audio media objects in the list of audio media objects and further wherein the list of audiovisual media objects is created by the list conversion engine using the set of visual media objects wherein each of the audiovisual media objects in the list of audiovisual media objects corresponds to one of the audio media objects referenced by the list of audio media objects.

In an embodiment, the list conversion engine is at least partially provided by an application executed by the computing device.

In an embodiment, the list conversion engine is accessed by the computing device using a network to which the computing device is connected.

In an embodiment, the system has a web page provided by a media service remotely located relative to the computing device wherein the computing device accesses the list conversion engine over a network using the web page provided by the media service.

In an embodiment, the user of the computing device uses the list of audiovisual media objects to render the audiovisual media objects referenced by the list of audiovisual media objects on a DLNA-compliant television in communication with the computing device over a home network.

In another embodiment of the present invention, a method for using a list of two or more audio media objects to create a list of two or more audiovisual media objects is provided. The method has the steps of for each audio media object in the list of audio media objects: obtaining metadata descriptive of the audio media object; searching one or more visual media object databases using the metadata, wherein the searching identifies a set of visual media objects which correspond to the audio media object; and determining an audiovisual media object for inclusion in the list of audiovisual media objects wherein the audiovisual media object is determined based on examining properties of the visual media objects which correspond to the audio media object; creating a list of audiovisual media objects wherein the list references each of the audiovisual media objects determined in the determining step; and displaying the list of audiovisual media objects to a user of a computing device.

In an embodiment, the obtaining step analyzes a playlist file to extract the metadata from the playlist file.

In an embodiment, the obtaining step examines at least one audio media object to extract the metadata from the audio media object.

In an embodiment, the list of audio objects references N audio objects wherein the list of audiovisual objects references N audiovisual objects wherein for each I in [1 ... N], the Ith audiovisual object in the list of audiovisual objects corresponds to the Ith audio object in the list of audio objects.

In an embodiment, the method has the step of presenting within the displayed list an interactive control associated with a first audiovisual media object of the list of audiovisual media objects wherein the interactive control allows the user to access a list of alternative audiovisual media objects and to select one of the alternative audiovisual media objects to replace the first audiovisual media object in the list of audiovisual media objects.

In an embodiment, the determining step for at least one of the audio media objects involves selecting one of the visual media objects to be the audiovisual media object for inclusion in the list of audiovisual media objects.

In an embodiment, the examined properties include at least one of a number of times the visual media object has been viewed and a rating for the visual media object.

In an embodiment, the determining step for at least one of the audio media objects involves detecting that a first visual media object has a restriction indication and selecting the first visual media object to be the audiovisual media object for inclusion in the list of audiovisual media objects at least partly on the basis of detecting the restriction indication.

In an embodiment, the determining step for at least one of the audio media objects involves combining visual content from at least one of the visual media objects with audio content from the audio media object to produce a new audiovisual media object wherein the new audiovisual media object is the audiovisual media object for inclusion in the list of audiovisual media objects.

In an embodiment, the determining step for at least one of the audio media objects involves processing audio content of the audio media object to produce a visualization animation for the audio media object and creating a new audiovisual media object based on the visualization animation wherein the new audiovisual media object is the audiovisual media object for inclusion in the list of audiovisual media objects.

In an embodiment, the determining step for at least one of the audio media objects involves creating an image which displays text information descriptive of the audio media object and combining the image with audio content from the audio media object to create a new audiovisual media object wherein the new audiovisual media object is created based on determining that the set of visual media objects which correspond to the audio media object is an empty set.

It is, therefore, an advantage of the present invention to provide a system and a method for using a list of audio media to create a list of audiovisual media.

Another advantage of the present invention is to provide a system and a method for using a list of audio media to create a list of audiovisual media having each audiovisual media object in the list of audiovisual media correspond to one of the audio media objects in the list of audio media.

And, another advantage of the present invention is to provide a system and a method for using a list of audio media available in a standard playlist format to create a list of audiovisual media.

A further advantage of the present invention is to provide a system and a method for using a list of audio media to create a list of audiovisual media available in a standard playlist format.

Another advantage of the present invention is to provide an online content service which uses a list of audio media objects created using a web page provided by an online content service to create a list of audiovisual media.

Yet another advantage of the present invention is to provide a system and a method which create a list of audiovisual media using a list of audio media specified by a standard playlist file uploaded to the online content service using a web site.

A further advantage of the present invention is to provide a system and a method for using a list of digital music tracks to create a list of music videos which correspond to the digital music tracks.

Another advantage of the present invention is to provide a system and a method for using a list of audio media to create a list of video media objects available from an online video sharing service.

Yet another advantage of the present invention is to provide a system and a method for using a list of audio media to create a list of audiovisual media by searching multiple visual media object databases in a preference order.

Another advantage of the present invention is to provide a system and a method which create a list of audiovisual media by combining one of the audio media objects in a list of audio media with a visual media object to produce one of the audiovisual media objects in the list of audiovisual media.

And, another advantage of the present invention is to provide a system and a method which present a list of candidate audiovisual media objects corresponding to one of the audio media objects in a list of audio media to a user so that user input from the user selects one of the candidate audiovisual media objects for inclusion in a list of audiovisual media.

Yet another advantage of the present invention is to provide a system and a method for using a list of audio media to create a list of audiovisual media stored in a playlist file having a first audiovisual media object corresponding to a first audio media object from the list of audio media and having an alternative audiovisual media object corresponding to the first audio media object encoded using comment fields in the playlist file.

A further advantage of the present invention is to provide a system and a method for using a list of audio media to create a list of audiovisual media which may enable a user to use the list of audiovisual media objects to view the audiovisual media objects.

Another advantage of the present invention is to provide a system and a method which enable a user to listen to audio media objects in a list of audio media using a computing device which enables the user to request creation of a corresponding list of audiovisual media using the user interface of the computing device.

Yet another advantage of the present invention is to provide a system and a method for using a list of audio media to create a list of audiovisual media which enable transfer of the audiovisual media objects in the list of audiovisual media to a rendering device in a home network after creation of the list of audiovisual media.

Moreover, another advantage of the present invention is to provide a system and a method for using a list of audio media to create a list of audiovisual media having at least one audiovisual media object created in response to a request to create the list of audiovisual media objects.

In addition, another advantage of the present invention is to provide a system and a method for using a list of audio media which references N audio objects to create a list of audiovisual media which references N audiovisual objects so that the Ith audiovisual object in the list of audiovisual objects corresponds to the Ith audio object in the list of audio objects for each I in [1 ... N].

Additional features and advantages of the present invention are described in, and will be apparent from, the detailed description of the presently preferred embodiments and from the drawings.

BRIEF DESCRIPTION OF THE DRAWINGS

FIGS. 1, 3a, 3b and 3c illustrate black box diagrams of systems for using a list of audio media to create a list of audiovisual media in embodiments of the present invention.

FIG. 2 illustrates a flowchart of a method for using a list of audio media to create a list of audiovisual media in an embodiment of the present invention.

FIGS. 4a, 4b, 4c and 4d illustrate embodiments of a user interface for using a list of audio media to create a list of audiovisual media in embodiments of the present invention.

DETAILED DESCRIPTION OF THE PREFERRED EMBODIMENTS

Figure 3A:
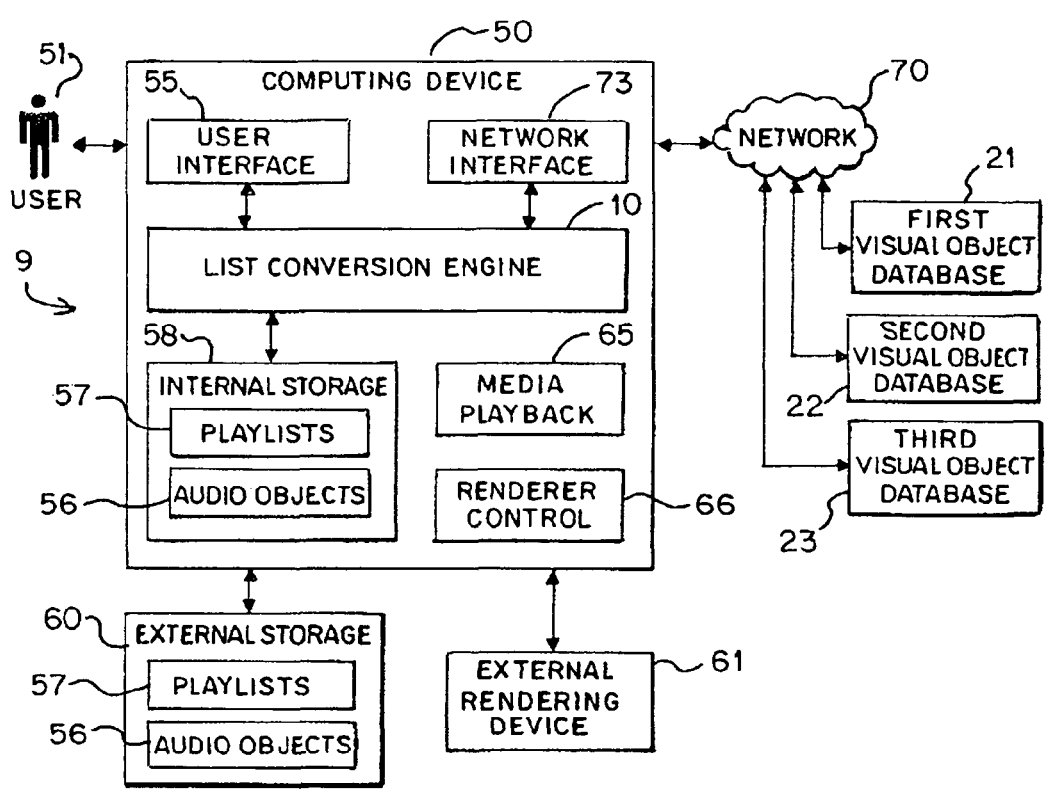

The present invention generally relates to a system and a method for using a list of audio media to create a list of audiovisual media. More specifically, a user of a computing device may create, may access, may edit and/or may use a list of audio media objects, such as, for example, an audio playlist. Then, the user may request generation of a list of audiovisual media objects which correspond to the audio media objects in the list of audio media objects. For example, the user may request generation of the list of audiovisual media objects using a user interface on the computing device.

The list of audio media objects may be provided to a list conversion engine which may discover, may create and/or may obtain audiovisual media objects which correspond to the audio media objects in the list of audio media objects. For example, the list conversion engine may search one or more visual media object databases to identify audiovisual media objects which correspond to the audio media objects in the list of audio media objects. The list conversion engine may base the visual media object database searches on metadata associated with the audio media objects in the list of audio media objects. For each audio media object in the list of audio media objects, the list conversion engine may identify a corresponding audiovisual media object from one of the visual media object databases and/or may create a corresponding audiovisual media object based on a combination of the audio media object and an available visual media object.

The list conversion engine may obtain the corresponding audiovisual media objects and/or references to the corresponding audiovisual media objects. Then, the list conversion engine may generate the list of audiovisual media objects based on the obtained and/or referenced audiovisual media objects.

As used herein, an "audio media object" is a digital media object which primarily conveys audio media. An MP3 file, an MP4 file containing a single media track of an audio type, and a Shoutcast (trademark of AOL Inc.) stream are examples of audio media objects. An audio media object may be a digital audio file, a digital audio stream, a music track, a song, an audio clip, a downloaded music object, and/or the like. The audio media object may be stored locally and/or remotely relative to a list of audio media objects which refers to the audio media object. For example, a playlist may reference a first digital audio file. The first digital audio file may be present on the same storage medium as the playlist, may be present in the same local network as the playlist, and/or may be accessible from the playlist location over the internet. The playlist may reference the first digital audio file using a local storage location, a remote network location, a URL and/or the like.

An audio media object database may be any database of audio media objects referenced by a list of audio media objects. For example, an audio media object database may be a library of digital music files; a collection of audio media objects on a digital storage medium, such as an electronic memory, a removable memory card, a hard drive or an optical disk; a collection of audio media objects on a media server device; a collection of audio media objects distributed among multiple storage devices in a local network; a collection of audio media objects available from a remote storage device via a network; a collection of audio media objects available from and/or accessible via a content service; and/or the like.

As used herein, an "audiovisual media object" is a digital media object which primarily conveys media having an audio component and a visual component. A Flash Video (FLV) file containing both audio and video, an MP4 file containing a first media track of an audio type and a second media track of a video type, and an RTSP session conveying an audio stream and a video stream are examples of audiovisual media objects.

As commonly used in the art, "video" refers to media which has an audio component and a visual component having moving pictures. A TV show, a movie, a short video clip, and an animated cartoon are examples of video media. According to this usage, a video media object is necessarily an audiovisual media object; however, the reverse is not necessarily true. For example, a still image displayed with accompanying audio and a digital photo slideshow rendered with accompanying audio are both examples of audiovisual media which are not video media according to the typical usage of the term "video." However, either of these example objects may be encoded into a video media format. For example, the digital photo slideshow and its associated audio content may be combined by a video encoding apparatus to produce an audiovisual file in a standard video format, such as MPEG-4. Therefore, as used herein, the term "video" may apply to any audiovisual content encoded in any video media format, regardless of whether the content has moving pictures. A video media format may be standardized or proprietary. A video media format may exist, for example, as a file, a stream, a progressive download, a cached object, a streaming session, and/or the like. Flash video, MPEG video, MP4 video, H.264 video, 3GPP video, and Ogg Theora video are well-known examples of video media formats.

As used herein, a "visual media object" refers to any media object which has a visual component, regardless of whether the media object has an audio component. A digital photograph, a photo slideshow, and an MP4 file containing an encoded TV show are examples of visual media objects. A visual media object may be a digital video file, a digital video stream, a music video, a fan video, a downloaded audiovisual media object, a video clip, a digital photograph, a collection of digital images, a collection of album cover images, a visual slideshow, a graphical animation, and/or the like.

A visual media object database may be any database of visual media objects accessible to and/or searchable by the list conversion engine. For example, a visual media object database may be a library of visual media object files and/or streams; a collection of visual media objects on a digital storage medium such as an electronic memory, a removable memory card, a hard drive or an optical disk; a collection of visual media objects on a media server device; a collection of visual media objects distributed among multiple storage devices in a local network; a collection of visual media objects available from a remote storage device via a network; a collection of visual media objects available from and/or accessible via a content service; and/or the like.

As used herein, a list of audio media objects may be a playlist; for example, the list of audio media objects may be available in a well-known playlist format, such as M3U. Alternatively, the list of audio media objects may be a proprietary file, a set of internal records, a list displayed in a user interface of a computing device, a list displayed on a web page, and/or the like. The list of audio media objects may be created, may be edited and/or may be maintained by the list conversion engine, a computing device associated with the list conversion engine, and/or a software program associated with the list conversion engine. Alternatively, the list of audio media objects may be created by a computing device and/or a software program which are unrelated to the list conversion engine. For example, the user may create a playlist using a separate playlist creation tool. Then, the user may provide the playlist as a playlist file to the list conversion engine and/or to a device, a software program associated with the list conversion engine, and/or a content service associated with the list conversion engine.

Similarly, a list of audiovisual media objects may be a playlist, a proprietary file, a set of internal records, a list displayed in a user interface of a computing device, a list displayed on a web page, and/or the like. The list of audiovisual media objects may be a "captive" list; for example, use of the list of media audiovisual media objects may be restricted to a particular device, a particular software program and/or a particular content service. Alternatively, the list of audiovisual media objects may be exportable, may be portable and/or may be shareable between devices, software programs and/or content services. For example, the list of audiovisual media objects may be available in a well-known playlist format, such as M3U.

An audiovisual media object may be stored locally and/or remotely relative to a list of audiovisual media objects which refers to the audiovisual media object. For example, a playlist may reference a first video file in a standard video file format, and the first video file may be present on the same storage medium as the playlist. Alternatively, the playlist may reference a first video stream available from a remote content server. If the list conversion engine creates an audiovisual media object for inclusion in a list of audiovisual media objects, the list conversion engine may store the created audiovisual media object in a location which the list of audiovisual media objects is capable of referencing. For example, the list conversion engine may store the created audiovisual media object locally with respect to a video playlist which references the created audiovisual media object using a local file reference. Alternatively, the list conversion engine may store the created audiovisual media object on a remote video server and then may generate the list of audiovisual media objects to reference the created audiovisual media object using a URL which targets the remote video server.

As used herein, "metadata" refers to information fields descriptive of an audio media object, a visual media object or an audiovisual media object. For example, the information fields may have one or more fields of a title, an artist, an author, a recording date, a music label, a publisher, a publication date, a copyright date, a genre, musical lyrics, a year, an album name, an album cover image, a URL and/or the like.

Referring now to the drawings wherein like numerals refer to like parts, FIG. 1 generally illustrates a system 9 for using a list of audio media objects 11 to create a list of audiovisual media objects 12 in an embodiment of the present invention. A list conversion engine 10 may use the list of audio media objects 11 to create the list of audiovisual media objects 12. The list conversion engine. 10 may have access to an audio media object database 20. For example, the list of audio media objects 11 may be a music playlist which references digital music files stored in the audio media object database 20, and the audio media object database 20 may be a library of digital music files accessible to the list conversion engine 10. The present invention is not limited to a specific number of audio media object databases 20, and any number of audio media object databases 20 may be accessed by the list conversion engine 10.

The list conversion engine 10 may obtain metadata descriptive of the audio media objects in the list of audio media objects 11. The list conversion engine 10 may obtain the metadata from the list of audio media objects 11. For example, an audio playlist may have metadata descriptive of each of the audio media objects referenced by the audio playlist. Alternatively or additionally, the list conversion engine 10 may obtain the metadata from the audio media objects. For example, an audio playlist may reference audio media objects available in the audio media object database 20, and the list conversion engine 10 may access the audio media objects to obtain the metadata. As a more detailed example, an audio playlist may reference a locally stored MP3 music file which has metadata stored in an ID3 tag format, and the list conversion engine 10 may access the locally stored MP3 music file to extract the metadata from the ID3 tags.

The list conversion engine 10 may have access to one or more visual media object databases. For example, The list conversion engine 10 may have access to a first visual media object database 21, a second visual media object database 22 and/or a third visual media object database 23. The present invention is not limited to a specific number of visual media object databases, and any number of visual media object databases may be implemented in the present invention.

For each audio media object in the list of audio media objects 11, the list conversion engine 10 may search the one or more visual media object databases to identify visual media objects which correspond to the audio media object. The search may be based on the metadata descriptive of the audio media object. For example, the list conversion engine 10 may have a song title, such as "Improbable Nation," and/or an artist, such as "James Peabody," obtained from a music playlist and/or extracted from a digital music file referenced by the music playlist. The list conversion engine 10 may use the song title and/or the artist as search terms for searching the one or more visual media object databases.

By searching one or more visual media object databases, the list conversion engine 10 may discover, may find and/or may identify visual media objects which correspond to the audio media objects in the list of audio media objects 11. For a particular audio media object, the list conversion engine 10 may discover, may find and/or may identify a single visual media object or multiple visual media objects. Alternatively, the list conversion engine 10 may fail to discover a visual media object corresponding to the particular audio media object.

A visual media object discovered, found and/or identified by the list conversion engine 10 may be a purely visual media object, such as a digital photograph, a collection of digital photographs, or a slideshow, for example. Alternatively, the visual media object discovered, found and/or identified by the list conversion engine 10 may be an audiovisual media object, such as a digital video file, a digital video stream, a music video, a fan video, a video clip, a television show, and/or the like.

Based on the visual media objects discovered, found and/or identified, the list conversion engine 10 may create and/or may generate the list of audiovisual media objects 12. The audiovisual media objects in the list of audiovisual media objects 12 may correspond to the audio media objects in the list of audio media objects 11. Hereafter various techniques which the list conversion engine 10 may use to create and/or generate the list of audiovisual media objects are described.

If the list conversion engine 10 identifies a single audiovisual media object which corresponds to a particular audio media object in the list of audio media objects 11, the list conversion engine 10 may include and/or may reference the single audiovisual media object in the list of audiovisual media objects 12. For example, the third audio media object in the list of audio media objects 11 may be a digital music track having the title "Improbable Nation." The list conversion engine 10 may search the first visual media object database 21 using the title "Improbable Nation." As a result, the list conversion engine 10 may identify a music video version of the song "Improbable Nation" available from the first visual media object database 21. The list conversion engine 10 may generate the list of audiovisual media objects 12 such that the third audiovisual media object in the list of audiovisual media objects 12 may be the music video version of the song "Improbable Nation."

If the list conversion engine 10 identifies multiple audiovisual media objects which correspond to a particular audio media object, the list conversion engine 10 may select a single audiovisual media object from the multiple identified audiovisual media objects. The list conversion engine 10 may include and/or may reference the selected audiovisual media object in the list of audiovisual media objects 12.

As a first example, the list conversion engine 10 may use properties of the multiple audiovisual media objects which are identified to select a single audiovisual media object for inclusion in the list of audiovisual media objects 12. The properties may be available from the one or more visual media object databases which provide the multiple audiovisual media objects which are identified. The properties may have and/or may be a confidence level; a rating; a user rating; a number of times the audiovisual media object has been viewed; a restriction indication; an indication of who created, published, and/or posted the audiovisual media object; and/or the like. The list conversion engine 10 may select the audiovisual media object from the multiple audiovisual media objects which are identified so that the selected audiovisual media object has the highest confidence level, rating, user rating and/or number of views. Alternatively, the list conversion engine 10 may select the audiovisual media object from the multiple audiovisual media objects which are identified based on recognition of the creator, the publisher and/or the provider of the audiovisual media object.

The list conversion engine 10 may use a restriction indication of an audiovisual media object to select the audiovisual media object from the multiple audiovisual media objects which are identified. The restriction indication may indicate that the audiovisual media object is protected by DRM, that the audiovisual media object is restricted to be used and/or displayed only on certain devices or device classes, that the audiovisual media object is prohibited from being used and/or displayed on certain devices or device classes, that the audiovisual media object is prohibited from being used and/or displayed in certain geographical areas, that transfer of the audiovisual media object requires a secure channel, and/or the like. A content provider and/or a visual media object database may provide the restriction indication to protect and/or to control the distribution, the consumption and/or the use of professionally produced and/or premium media content objects. Therefore, the list conversion engine 10 may use the presence of restriction indications to detect and/or to distinguish media content likely to be professionally produced and/or premium media content. Thus, an audiovisual media object associated with one or more restriction indications may be selected from multiple identified audiovisual media objects for inclusion in the list of audiovisual media objects 12. Alternatively, the presence or absence of restriction indications may be combined with other media object properties to select an audiovisual media object for inclusion in the list of audiovisual media objects 12.

The selection of an audiovisual media object based on a restriction indication may depend on whether the indicated restriction may be satisfied. For example, an audiovisual media object may have a restriction indication prohibiting display of the audiovisual media object on mobile devices. Consequently, a list conversion engine 10 may not select the audiovisual media object for inclusion in a list of audiovisual media objects intended for use on a mobile device. However, if the list conversion engine 10 is creating a list of audiovisual media objects for use on a non-mobile device, such as a desktop PC, then the list conversion engine 10 may select the audiovisual media object for inclusion in the list. Moreover, the list conversion engine 10 may use the presence of the restriction indication as an indication that the audiovisual media object may be professionally produced and/or may be premium content, and may select the audiovisual media object based on the presence of the restriction indication.

As a second example, the list conversion engine 10 may have a preference order for the visual media object databases. The list conversion engine 10 may use the preference order to select the audiovisual media object from multiple audiovisual media objects which are identified. For example, the first visual media object database 21 may be a database of professionally produced music videos, and the second visual media object database 22 may be a database of fan videos, namely amateur videos produced and/or uploaded by music fans. The list conversion engine 10 may have a preference order which prefers a professionally produced music video over a fan video. Therefore, the list conversion engine 10 may select an audiovisual media object from the first visual media object database 21 if an audiovisual media object corresponding to the audio media object is found by searching the first visual media object database 21. If no audiovisual media objects corresponding to the audio media object are found by searching the first visual media object database 21, the list conversion engine 10 may select an audiovisual media object from the second visual media object database 22. In this way, the list conversion engine 10 may access and/or may search any number of visual media object databases which have an associated preference order.

As a third example, the list conversion engine 10 may accept input from a user to select an audiovisual media object from multiple audiovisual media objects which are identified. The list conversion engine 10 may use a user interface of a computing device to display a list which has one or more of the multiple audiovisual media objects which are identified. The user interface may accept user input to select one of the multiple audiovisual media objects which are identified. As a result, the list conversion engine 10 may include the audiovisual media object selected by the user input in the list of audiovisual media objects 12.

As a fourth example, the list conversion engine 10 may select a default audiovisual media object for inclusion in the list of audiovisual media objects 12. The list conversion engine may indicate to the user that additional alternative audiovisual media objects are identified. The list conversion engine 10 may enable the user to access, use and/or play the list of audiovisual media objects 12 containing the default audiovisual media object selected by the list conversion engine 10. Further, the list conversion engine 10 may enable the user to access a list of alternative audiovisual media objects, such as the multiple audiovisual media objects identified by the list conversion engine 10, and select a different audiovisual media object for inclusion in the list of audiovisual media objects 12.

The list conversion engine 10 may maintain records of the multiple audiovisual media objects corresponding to each of the audio media objects. The list conversion engine 10 and/or another component may use the records to identify to the user that an audiovisual media object in the list of audiovisual media objects 12 may have additional alternative media objects which may then be presented for selection by the user. In this way, the list of audiovisual media objects 12 may be dynamic. For example, a user may replace an audiovisual media object with an alternative audiovisual media object which may have been identified by earlier searches executed by the list conversion engine 10.

The records of the multiple audiovisual media objects corresponding to a particular audio media object may be stored in a playlist file. For example, the records of the multiple audiovisual media objects may be included as "comments" in an M3U playlist file. As known to one skilled in the art, the M3U playlist format allows "comment" fields to be identified by a leading pound character, namely "#". Therefore, the list conversion engine 10 may create and/or may generate the list of audiovisual media objects 12 as an M3U playlist file and/or may encode the multiple audiovisual media objects as comment fields in the M3U playlist file.

In this way, the comment fields which specify the multiple audiovisual media objects in the M3U playlist file may be ignored by devices and applications which do not support the capability to offer the multiple audiovisual media objects specified in an M3U playlist file. Such devices and applications may be able to access and use the M3U playlist file but may not identify or present the multiple audiovisual media objects to a user of the device or the application, respectively.

However, the list conversion engine 10 and/or a device or an application which is capable of offering multiple audiovisual media objects in an M3U playlist file may recognize the comment fields which specify the multiple audiovisual media objects. In this way, the list conversion engine 10, the device and/or the application may identify to the user that alternative audiovisual media objects exist for an audiovisual media object referenced by the playlist. An option may be provided for the user to explore and to select one of the alternative audiovisual media objects.

The preceding example uses "comment" fields available in an M3U playlist file; however, the present invention is not limited to this example. One skilled in the art will recognize other ways in which the records which specify the multiple audiovisual media objects corresponding to an audio media object may be encoded in a playlist file. For example, a new playlist file format may be created and/or an existing playlist file format may be extended to include fields for representing the multiple audiovisual media objects corresponding to an audio media object. As known in the art, an existing file format may have a generic extension mechanism used for adding new data fields, and the generic extension mechanism may be suitable for adding fields for representing the multiple audiovisual media objects corresponding to an audio media object.

The records which specify the multiple audiovisual media objects corresponding to an audio media object may be stored in other ways. For example, the list conversion engine 10 may store the records in a file, in a database, on a local disk, on a network attached storage device, and/or the like. The present invention does not require storage of the records in a playlist file. However, storage of the records in a playlist file may be advantageous because records stored in a playlist file are portable and may be carried by the playlist file from a device and/or an application to a different device and/or a different application.

If the list conversion engine 10 identifies one or more purely visual media objects which correspond to a particular audio media object, then the list conversion engine 10 may create an audiovisual media object using one or more of the purely visual media objects identified. The list conversion engine 10 may create the list of audiovisual media objects 12 to include the audiovisual media object created from the one or more of the purely visual media objects identified.

For example, the first audio media object in the list of audio media objects 11 may be a digital music track with a title of "Rock the Mountain" and an album name of "Nature Calls." The list conversion engine 10 may use the title and/or the album name to search one or more available visual media object databases. As a result, the list conversion engine 10 may identify photographs associated with the title and/or the album name. The list conversion engine 10 may access and/or may retrieve the photographs from the one or more available visual media object databases. Then, the list conversion engine 10 may combine the photographs with the first audio media object. For example, the list conversion engine 10 may encode the photographs together with the first audio media object using a video encoder. In this way, the list conversion engine 10 may create an audiovisual media object, namely a visual slide show which displays the photographs concurrently with playback of the digital music track. The audiovisual media object created by combining the photographs with the digital music track may correspond to the first audio media object and/or may be included in the list of audiovisual media objects 12. In an embodiment, the list conversion engine 10 may create an audiovisual media object by combining the audio media object with one or more purely visual media objects in response to a failure to identify any available audiovisual media objects which correspond to the audio media object.

If the list conversion engine 10 fails to identify a media object which corresponds to the audio media object, the list conversion engine 10 may create an audiovisual media object based on the audio media object. The list conversion engine 10 may include the created audiovisual media object in the list of audiovisual media objects 12. Alternatively, the list conversion engine 10 may include the audio media object in the list of audiovisual media objects 12 if the list of audiovisual media objects 12 accommodates a mixture of audiovisual media objects and audio media objects. As another alternative, the list conversion engine 10 may omit an entry in the list of audiovisual media objects 12 if an audio media object does not have a corresponding visual media object.

Several examples follow for creation of an audiovisual media object based on the audio media object if no corresponding visual media object is identified. As a first example, the list conversion engine 10 may encode the audio media object together with a static image using a video encoder. As a result, the list conversion engine 10 may produce an audiovisual media object in a video media format so that rendering of the audiovisual media object displays the static image concurrently with playback of the audio media object. The static image may be a blank video frame, a black video frame, a gray video frame, a frame displaying a text message, a frame displaying a corporate logo, a frame displaying an album cover, and/or the like. The text message may indicate that visual content is not available for the audio media object. For example, the text message may say "Sorry, no video found." The text message may provide descriptive metadata for the audio media object.

As a second example, the list conversion engine 10 may encode the audio media object together with a music visualization animation. The music visualization animation may have and/or may be moving pictures generated in response to the content, the pitch, the tempo, the energy, the volume and/or the frequency decomposition of the audio media object. The list conversion engine 10 may decode and/or may analyze the audio media object to generate the music visualization animation. Then, the list conversion engine 10 may encode the audio media object together with the generated music visualization animation using a video encoder. As a result, the list conversion engine 10 may create an audiovisual media object in a video media format, and the audiovisual media object may have the audio media object synchronized to a music visualization animation. The music visualization animation may display lines, bars, patterns, pulses, cartoons, an equalizer, lightning bolts, and/or any visual design animated using properties of the audio media object. Music visualization animations are used to provide visual effects within a software music player and are well known in the art. Windows Media Player (trademark of Microsoft Corporation) and the WinAmp player (trademark of AOL LLC) are examples of software music players which support music visualization animations.

The list of audiovisual media objects 12 may be created by the list conversion engine 10 as a mix of the various types of audiovisual media objects discussed herein. The types of audiovisual media objects included in the list of audiovisual media objects 12 may depend on the search results corresponding to each audio media object.

For example, the list of audio media objects 11 may have a first digital music track, a second digital music track and a third digital music track. The list conversion engine 10 may search one or more available visual media object databases using metadata descriptive of the first digital music track and, as a result, may identify a first audiovisual media object corresponding to the first digital music track. The list conversion engine 10 may search the one or more available visual media object databases using metadata descriptive of the second digital music track. As a result, the list conversion engine 10 may find multiple audiovisual media objects corresponding to the second digital music track. The list conversion engine 10 may select a second audiovisual media object from the multiple audiovisual media objects using one of the selection techniques discussed previously. The list conversion engine 10 may search the one or more available visual media object databases using metadata descriptive of the third digital music track and, as a result, may find purely visual media objects corresponding to the third digital music track. Accordingly, the list conversion engine 10 may create a third audiovisual media object by encoding one or more of the purely visual media objects together with the third audio media object.

As a result, the list conversion engine 10 may create and/or may generate the list of audiovisual media objects 12 to have the first audiovisual media object, the second audiovisual media object and the third audiovisual media object. Further, the list conversion engine 10 may indicate to the user that the second audiovisual media object is one of multiple audiovisual media objects corresponding to the second audio media object. The list conversion engine 10 may offer the user an option to select one of the multiple audiovisual media objects corresponding to the second audio media object. The selected audiovisual media object may be used as the second audiovisual media object in the list of audiovisual media objects 11.

FIG. 2 generally illustrates a method 30 for using the list of audio media objects 11 to create the list of audiovisual media objects 12 in an embodiment of the present invention. In step 32, the list of audio media objects 11 may be analyzed to obtain metadata descriptive of the audio media objects. For example, one or more audio media objects referenced by the list of audio media objects 11 may accessed to enable extraction of the metadata from the audio media object. The list of audio media objects 11 may be analyzed to obtain the metadata in response to a request from a user to create the list of audiovisual media objects 12. In an embodiment, the list of audio media objects 11 may be a playlist, and the metadata may be stored in the playlist. The list of audio media objects 11 may have a first audio media object, a second audio media object and/or a third audio media object. The list of audio media objects 11 may have any number of audio media objects, and the present invention is not limited to a specific number of audio media objects in the list of audio media objects 11.

In step 34, the metadata descriptive of the audio media objects may be used to search one or more databases of visual media objects. The one or more databases of visual media objects may be, for example, a database of professionally produced music videos, a video sharing service which has fan videos, a database which has digital photographs uploaded by users, and/or the like. The metadata may be used to search the one or more databases of visual media objects without any additional user input subsequent to the request to create the list of audiovisual media objects 12. In step 36, visual media objects available from the one or more databases of visual media objects may be identified so that each of the visual media objects corresponds to one of the audio media objects in the list of audio media objects 11. For example, a first visual media object may be identified which may correspond to the first audio media object, a second visual media object may be identified which may correspond to the second audio media object, and/or a third visual media object may be identified which may correspond to the third audio media object.

In step 38, the visual media objects identified may be used to generate the list of audiovisual media objects 12. Each audiovisual media object in the list of audiovisual media objects 12 may correspond to one of the audio media objects in the list of audio media objects 11, and/or each of the audio media objects in the list of audio media objects 11 may correspond to one of the audiovisual media objects in the list of audiovisual media objects 12. For example, a first audiovisual media object may correspond to the first audio media object, a second audiovisual media object may correspond to the second audio media object, and/or a third audiovisual media object may correspond to the third audio media object.

In response to the request from the user to create the list of audiovisual media objects 12, the list conversion engine 10 may obtain the metadata descriptive of the audio media objects in the list of audio media objects 11, may use the metadata to search one or more visual media object databases to identify visual media objects which correspond to the audio media object, may identify visual media objects which correspond to the audio media objects in the list of audio media objects 11, and/or may create the list of audiovisual media objects 12. The list conversion engine 10 may obtain the metadata descriptive of the audio media objects in the list of audio media objects 11, may use the metadata to search one or more visual media object databases to identify visual media objects which correspond to the audio media object, may identify visual media objects which correspond to the audio media objects in the list of audio media objects 11, and/or may create the list of audiovisual media objects 12 without any additional user input subsequent to the request from the user to create the list of audiovisual media objects 12.

One or more of the audiovisual media objects in the list of audiovisual media objects 12 may be one of the visual media objects identified in step 36. Further, one or more of the audiovisual media objects in the list of audiovisual media objects 12 may be created by combining one of the visual media objects identified in step 36 with the corresponding audio media object. Still further, one or more of the audiovisual media objects in the list of audiovisual media objects 12 may be created if a visual media object which corresponds to the audio media object is not identified. For example, the audio media object may be encoded together with a static image using a video encoder to produce an audiovisual media object in a video media format. As another example, the audio media object may be encoded together with a music visualization animation to produce an audiovisual media object in a video media format. Alternatively, the audio media object may be included in the list of audiovisual media objects 12 if the list of audiovisual media objects 12 accommodates a mixture of audiovisual media objects and audio media objects. As another alternative, an entry in the list of audiovisual media objects 12 may be omitted if an audio media object does not have a corresponding visual media object.

In an embodiment, a list of candidate audiovisual media objects may be displayed to a user. Each of the candidate audiovisual media objects may correspond to one of the visual media objects identified in step 36. User input may select one of the objects from the list of candidate audiovisual media objects, and the selected candidate audiovisual media object may be included in the list of audiovisual media objects 12 in response to the user input.

In step 40, the list of audiovisual media objects 12 may be made available to a user. The list of audiovisual media objects 12 may be provided to a user in a standard playlist format. The list of audiovisual media objects 12 may be displayed to the user on a computing device. The audiovisual media objects in the list of audiovisual media objects 12 may be obtained and/or may be stored on a storage medium. The user may use the list of audiovisual media objects 12 for playback of the audiovisual media objects on a rendering device.

Figure 3B:
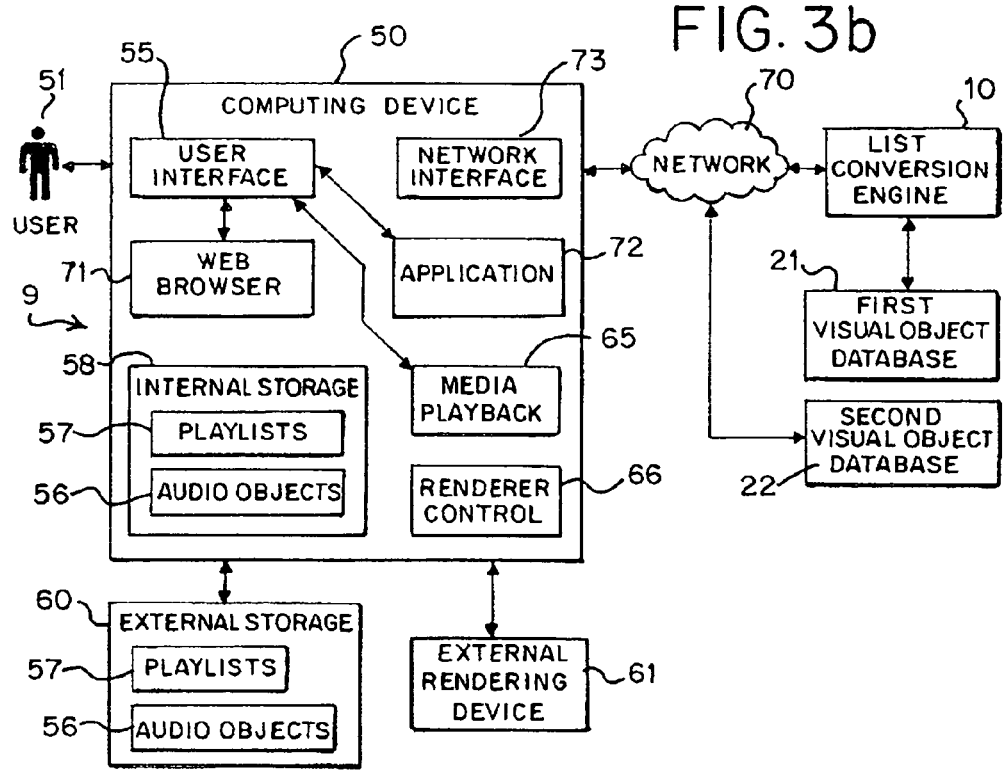
Figure 3C:
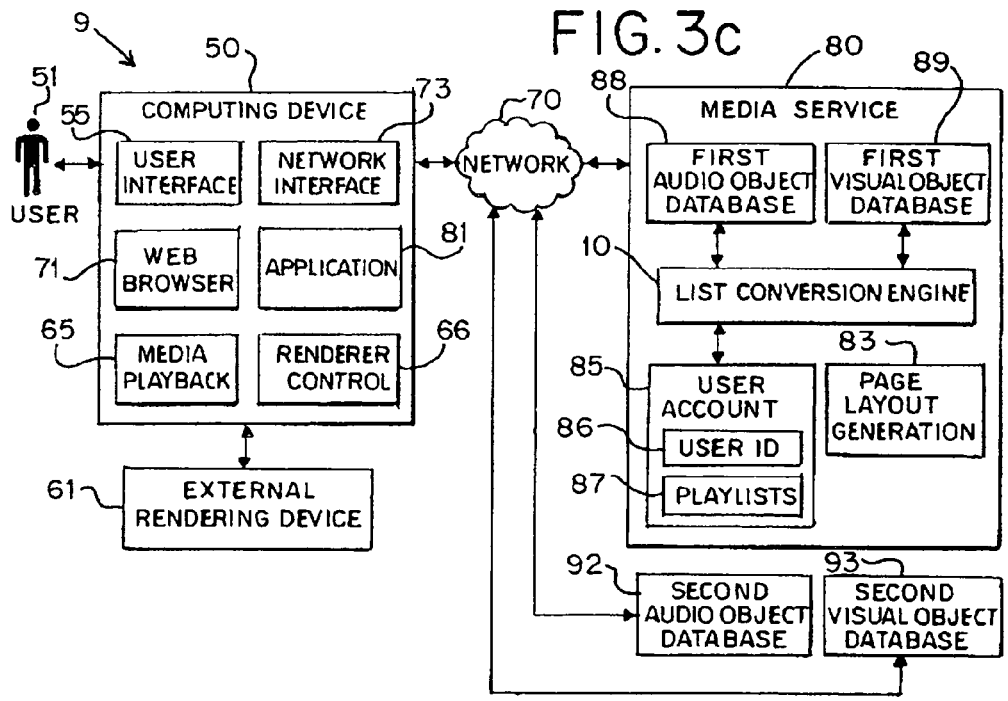

FIGS. 3a-3c generally illustrate embodiments of the system 9 for using the list of audio media objects 11 to create the list of audiovisual media objects 12. FIG. 3a generally illustrates an embodiment in which the list conversion engine 10 may be embodied in a computing device 50 of a user 51. For example, the computing device 50 may be a desktop PC, a laptop PC, a mobile device, a music rendering device, a networked stereo, a media player, a UPnP-compliant rendering device, a DLNA-compliant rendering device, a video gaming system, a set-top box, a networked television, and/or the like. The mobile device may be a mobile phone, a smartphone, a personal digital assistant, a portable gaming device, a portable media player, a portable music player, and/or the like. The list conversion engine 10 may be software running on a general purpose. CPU of the computing device 50. The software may be an application installed by the user 51, a downloadable application, a program installed on the computing device 50 before purchase of the computing device 50, a component of the operating system of the computing device 50, a script executed by a web browser running on the computing device 50, and/or the like. Alternatively, the list conversion engine 10 may be partially or entirely provided by specialized hardware, such as, for example, a DSP, a programmable gate array, a secure hardware chip, and/or the like. The present invention is not limited to a specific means for implementing the logic and function of the list conversion engine 10, and the list conversion engine 10 may be embodied in the computing device 50 using any means known to one having ordinary skill in the art.

The computing device 50 may have a user interface 55 which may enable the user 51 to use the computing device 50. The user interface 55 may enable the user 51 to access audio media objects 56 and/or lists of audio media objects 57. For example, the audio media objects 56 and/or the lists of audio media objects 57 may be stored in internal storage 58 on the computing device 50 and/or may be available on an external storage 60 accessible to the computing device 50. The external storage 60 may be, for example, a removable memory device, a hard drive connected to the computing device 50, a media server accessible to the computing device 50 over a network, an online music content service, and/or the like. The present invention is not limited to these examples, and the audio media objects 56 and the lists of audio media objects 57 may be stored on any storage location accessible to the computing device 50.

The user interface 55 may enable the user 51 to create, to edit, to generate and/or to maintain the lists of audio media objects 57. For example, the user interface 55 may enable the user 51 to create and/or to edit a playlist which references multiple audio media objects. Alternatively or additionally, one or more of the lists of audio media objects 57 may not have been created by the user 51, and the user interface 55 may enable the user 51 to discover, access and/or use the lists of audio media objects 57 not created by the user 51. For example, the user interface 55 may enable the user 51 to access playlists created by other users, provided by an external playlist sharing site, created professionally by an online music service, and/or the like. The present invention is not limited to these examples, and present invention may utilize lists of audio media objects created in any manner and by any source.

The user interface 55 may enable the user 51 to access one of the lists of audio media objects 57, such as a playlist, and/or play the audio media objects referenced by the selected list of audio media objects. For example, the user interface 55 may enable the user 51 to play the audio media objects 56 on the computing device 50 and/or an external rendering device 61, such as a networked stereo accessible to the computing device. The computing device 50 may have a media playback element 65 which may play the audio media objects 56 and/or may enable the user 51 to listen to the audio media objects 56 using the computing device 50. The media playback element 65 may be, for example, a software media player capable of decoding and rendering digital audio files and/or streams. Further, the computing device 50 may have a renderer control element 66 which may enable the external rendering device 61 to play the audio media objects 56. For example, the renderer control element 66 may function as a UPnP AV control point, and/or the external rendering device 61 may be a UPnP compliant audio rendering device.

The user interface 55 may enable the user 51 to request creation of the list of audiovisual media objects 12 based on the list of audio media objects 11. For example, the list of audio media objects 11 may be one of the lists of audio media objects 57 accessible to the computing device 50. The user interface 55 may present a control for requesting creation of the list of audiovisual media objects 12. The control may be a button, a soft key, a menu item, a selectable icon, and/or the like, for example. One skilled in the art will recognize that the control may vary based on the user interface capabilities of the computing device 50, and the present invention is not limited to a specific embodiment of the control.

The user 51 may request that the list of audiovisual media objects 12 be created; for example, the user 51 may invoke the control after selecting, accessing and/or otherwise identifying the list of audio media objects 11. As a result, the list conversion engine 10 may use the list of audio media objects 11 to create the list of audiovisual media objects 12. The list conversion engine 10 may employ any of the various steps and techniques described previously to create the list of audiovisual media objects 12.

For example, the list conversion engine 10 may access the list of audio media objects 11 as a playlist from the internal storage 58 of the computing device 50 or from the external storage 60. The list conversion engine 10 may analyze the audio media objects in the list of audio media objects 11 to obtain the metadata descriptive of the audio media objects in the list of audio media objects 11. Then, the list conversion engine 10 may search one or more available visual media object databases to identify visual media objects which correspond to the audio media objects in the list of audio media objects 11.

The available visual media object databases, such as, for example, the first visual media object database 21, the second visual media object database 22 and/or the third visual media object database 23, may be accessible to the computing device 50 over a network 70. The network 70 may be, for example, a local area network, a wide area network, the internet, or some combination of multiple networks. The list conversion engine 10 may communicate with the available visual media object databases using a network interface 73 available on the computing device 50.

After identifying the visual media objects which correspond to the audio media objects in the list of audio media objects 11, the list conversion engine 10 may generate the list of audiovisual media objects 12. To generate the list of audiovisual media objects 12, the list conversion engine 10 may employ any of the previously presented techniques for identifying, selecting and/or creating the audiovisual media objects for inclusion in the list of audiovisual media objects 12.

For example, the list conversion engine 10 may select an audiovisual media object which corresponds to an audio media object and may include the selected audiovisual media object in the list of audiovisual media objects 12. As another example, the list conversion engine 10 may solicit user input to select an audiovisual media object from multiple audiovisual media objects which correspond to the audio media object. Then, the selected audiovisual media object selected by the user input may be included in the list of audiovisual media objects 12. As another example, the list conversion engine 10 may create an audiovisual media object by combining one of the audio media objects with one or more visual media objects which correspond to the one of the audio media objects. Then, the audiovisual media object created by the list conversion engine 10 may be included in the list of audiovisual media objects 12. The list conversion engine 10 may combine such techniques depending on the number and/or the type of visual media objects which correspond to each of the audio media objects in the list of audio media objects 11.

The list conversion engine 10 may generate the list of audiovisual media objects 12 and may make the list of audiovisual media objects 12 available to the user 51. For example, the list of audiovisual media objects 12 may be displayed by the user interface 55 of the computing device 50; may be rendered for the user 51 by the computing device 50, such as, for example, by the media playback element 65; and/or may be rendered using the external rendering device 61. The user interface 55 may display the list of audiovisual media objects 12 to the user 51 with an indication that multiple audiovisual media objects correspond to one or more of the audiovisual media objects in the list of audiovisual media objects 12. The list conversion engine 10 may store the audiovisual media objects referenced by the list of audiovisual media objects 12 in the internal storage 58 and/or the external storage 60.

In an embodiment, the list of audiovisual media objects 12 may be stored as a playlist, such as, for example, in the internal storage 58 and/or the external storage 60, which may then be used by a device other than the computing device 50. In an embodiment, the computing device 50 may generate the list of audiovisual media objects 12 and/or begin rendering the list of audiovisual media objects 12 on the media playback element 65 and/or the external rendering device 61 in response to the user 51 invoking the control which requests creation of the list of audiovisual media objects 12.

For example, the list of audio media objects 11 may be used to play the audio media objects, and the user 51 of the computing device 50 may control the playing of the audio media objects using the user interface 55 of the computing device 50. The computing device 50 may accept user input which prompt creation of the list of audiovisual media objects 12. Then, a rendering device which is a different device than the computing device 50, such as the external rendering device 61, may play the audiovisual media objects in the list of audiovisual media objects 12. The computing device 50 may stop playing the audio media objects and/or may instruct the rendering device to begin playing the audiovisual media objects without additional user input requesting playback of the audiovisual media objects subsequent to the user input which prompts creation of the list of audiovisual media objects 12.

FIG. 3*b* generally illustrates an embodiment of the system 9 for using the list of audio media objects 11 to create the list of audiovisual media objects 12 in which the list conversion engine 10 may be embodied as a remote service accessible to the computing device 50 over the network 70. For example, the list conversion engine 10 may be embodied on a web server, an application server, a virtual server, a remotely located peer computing device, and/or the like. Functions of the list conversion engine 10 may be associated with a content service, such as a music service, a music video service, a video sharing service, and/or the like. Alternatively, functions of the list conversion engine 10 may not be associated with a content service. For example, the list conversion engine 10 may create the lists of audiovisual media objects 12 by searching one or more visual media object databases which are not associated with the list conversion engine 10 but which provide accessible search facilities, such as an application programming interface ("API") for searching.

The functions of the list conversion engine 10 may be accessible to the computing device 50 using a web page. The computing device 50 may access the web page using a web browser 71 provided by the computing device 60. Then, the user 51 of the computing device 50 may access the functions of the list conversion engine 10 using the web browser 71. For example, the web page may present a music service in which the user 51 of the computing device 50 may identify music tracks, create and edit audio playlists based on the discovered music tracks, and listen to the music tracks using the audio playlists. Further, the web page may present a control for using one or more of the audio playlists to create the list of audiovisual media objects 12. The user 51 may invoke the control using the web browser 71 and, as a result, the list conversion engine 10 remotely located relative to the computing device 50 may use the audio playlist to generate the list of audiovisual media objects 12.

Alternatively, the functions of the list conversion engine 10 may be accessible to the computing device 50 through an application 72 executed by the computing device 50. The application 72 may be associated with the list conversion engine 10 remotely located relative to the computing device 50 and/or may be associated with a content service which provides the list conversion engine 10. The application 72 may present the user interface 55 on the computing device 50. The user interface 55 may enable the user 51 of the computing device 50 to create, edit, access, identify and/or use the list of audio media objects 11, such as a playlist. The application 72 and/or the user interface 55 may further present a control for generating the list of audiovisual media objects 12 based on the list of audio media objects 11. The user 51 may invoke the control, and, as a result, the application 72 may communicate with the list conversion engine 10 using the network 70 to generate the list of audiovisual media objects 12. The web browser 71 and/or the application 72 may communicate with the list conversion engine 10 using the network interface 73 available on the computing device 50.

The list conversion engine 10 may have and/or may obtain the list of audio media objects 11. As a first example, the application 72 executed by the computing device 50 may transmit the list of audio media objects 11 to the list conversion engine 10. As a second example, the list of audio media objects 11 may be provided to the list conversion engine 10 by a content service which creates the list of audio media objects 11 and/or enables the user 51 to create the list of audio media objects 11. As a third example, the user 51 may upload the list of audio media objects 11 as a playlist file using a web page associated with the list conversion engine 10 and/or a content service which provides the list conversion engine 10.

The list conversion engine 10 may analyze the list of audio media objects 11 to obtain the metadata descriptive of the audio media objects in the list of audio media objects 11.

Then, the list conversion engine 10 may search one or more visual media object databases to identify the visual media objects which correspond to the audio media objects in the list of audio media objects 11.

In FIG. 3*b*, the visual media object databases are depicted as the first visual media object database 21 and the second visual media object database 22. The first visual media object database 21 may be connected to the list conversion engine 10, and/or the second visual media object database 22 may be accessible to the list conversion engine 10 over the network 70. However, any number of visual media object databases may be accessible to and/or may be searched by the list conversion engine 10. The first visual media object database 21 may be, for example, a collection of media objects associated with a content service which provides the list conversion engine. The second visual media object database 22 may be, for example, a collection of media objects not associated with the content service. In an embodiment, the first visual media object database 21 may be a database of professionally produced music videos, and/or the second visual media object database 22 may be a video sharing site which has fan videos.

After identifying visual media objects which correspond to the audio media objects in the list of audio media objects 11, the list conversion engine 10 may generate the list of audiovisual media objects 12. To generate the list of audiovisual media objects 12, the list conversion engine 10 may employ any of the previously presented techniques for identifying, selecting and/or creating audiovisual media objects for inclusion in the list of audiovisual media objects 12.

For example, the list conversion engine 10 may select an audiovisual media object which corresponds to an audio media object and may include the selected audiovisual media object in the list of audiovisual media objects 12. As another example, the list conversion engine 10 may solicit user input to select an audiovisual media object from multiple audiovisual media objects corresponding to the audio media object. Then, the list conversion engine 10 may include the audiovisual media object selected by the user input in the list of audiovisual media objects 12. As another example, the list conversion engine 10 may create an audiovisual media object by combining one of the audio media objects with one or more visual media objects which correspond to the one of the audio media objects. Then, the list conversion engine 10 may include the created audiovisual media object in the list of audiovisual media objects 12. The list conversion engine 10 may combine such various techniques depending on the number and/or the type of visual media objects which correspond to each of the audio media objects in the list of audio media objects 11.

The list conversion engine 10 may generate the list of audiovisual media objects 12 and may make the list of audiovisual media objects 12 available to the user 51. As a first example, the list of audiovisual media objects 12 may be displayed as a web page in the web browser 71 provided by the computing device 50. As a second example, the list of audiovisual media objects 12 may be displayed to the user 51 in the user interface 55 presented by the application 72 executed by the computing device 50. As a third example, the list of audiovisual media objects 12 may be transmitted to the computing device 50 over the network 70 and/or may be stored in a playlist format in a storage location accessible to the computing device 50. The storage location may be, for example, the internal storage 58 and/or the external storage 60.

The audiovisual media objects of the list of audiovisual media objects 12 may be rendered for the user 51 on the computing device 50. For example, the audiovisual media objects of the list of audiovisual media objects 12 may be rendered on the user interface 55, the media playback element 65, and/or the external rendering device 61. In an embodiment, the external rendering device 61 may be a DLNA-compatible television.

In an embodiment, the audiovisual media objects of the list of audiovisual media objects 12 may be transmitted to the computing device 50 and/or may be stored in a storage location accessible to the computing device 50. The storage location may be, for example, the internal storage 58 and/or the external storage 60. In an embodiment, the audiovisual media objects of the list of audiovisual media objects 12 may be accessible from a remote content source using the network 70, and/or the remote content source may provide the list conversion engine 10.

FIG. 3*c* generally illustrates an embodiment of the system 9 for using the list of audio media objects 11 to create the list of audiovisual media objects 12 in which the list conversion engine 10 may be provided by a media service 80. The computing device 50 may access the media service 80 over the network 70. The network 70 may be, for example, the internet; a wide-area network, such as a mobile carrier network; and/or a network provided by an internet service provider. The network 70 may be a combination of multiple networks and/or may combine multiple network connection technologies such as Ethernet, Firewire (trademark of Apple Computer, Inc.), IEEE 802.11 ("Wi-Fi"), Multimedia over Coax ("MoCa"), optical fiber, GPRS, UMTS, WiMax, and/or the like.

The media service 80 may provide audio, visual and/or audiovisual media objects to users, such as the user 51 of the computing device 50. A single user and a single computing device are shown in FIG. 3*c*, but the media service 80 may be connected to many users through many various computing devices. The media service 80 may provide media objects to the user 51 through a web page or a series of web pages (hereinafter "the web pages"). The computing device 50 may access the web pages and/or may present the web pages to the user using the web browser 71 provided by the computing device 50. Alternatively, the media service 80 may provide media objects to the user 51 through an application 81 executed by the computing device 50. The application 81 may communicate with the media service 80 to enable the user 51 to discover, access, organize, obtain and/or play the media objects available through the media service 80. The application 81 may be provided by and/or may be associated with the media service 80.

The web browser 71 and/or the application 81 may communicate with the media service 80 using the network interface 73 available on the computing device 50. Further, the web browser 71 and/or the application 81 may present information to the user 51 and/or may accept user input using the user interface 55 of the computing device 50. As a result, the user 51 may interact with the media service 80 to discover, access, organize, obtain and/or play the media objects available through the media service 80.

For example, the media service 80 may be an Internet media service which may enable the user 51 to browse, search and/or discover the media objects available from the internet media service. The internet media service may enable the user 51 to stream the media objects to the computing device 50 which may be, for example, a desktop PC, a laptop PC, a mobile device, and/or the like. As another example, the media service 80 may be associated with a television service provider and may enable customers of the television service provider to browse, search and/or discover on-demand media objects available from the television service provider. The media service 80 associated with a television service provider may enable the user 51 to stream the media objects to the computing device 50, which may be a set-top box provided by the television service provider. The television service provider may be, for example, a cable television provider, a satellite television provider, an IPTV provider, and/or the like. As a third example, the media service 80 may be a media service associated with a mobile phone operator and may enable subscribers of the mobile phone operator to browse, search, and/or discover media objects available from the mobile phone operator. The media service 80 associated with a mobile phone operator may enable the user 51 to stream the media objects to the web browser 71 and/or the application 81 on the computing device 50, which may be, for example, a mobile phone, a personal digital assistant, a tablet device, a laptop PC, and/or the like. These examples generally illustrate embodiments of a media service which may provide the list conversion engine 10; however, the present invention is not limited to these examples.

The media service 80 may provide audio media objects, such as, for example, digital music tracks, digital music albums, digital music streams, audio podcasts, audio books, audio clips, and/or the like. The media service 80 may provide audiovisual media objects, such as, for example, music videos, video clips, news clips, fan videos, promotional videos, video streams, and/or the like. The media service 80 may provide media objects which encode purely visual media objects. For example, the media service 80 may provide digital photographs, collections of digital photographs, slideshows, visual animations, and/or the like.

The media service 80 may have and/or may be one or more servers. The servers may be, for example, web servers, media servers, application servers, caching servers, and/or the like. The servers may be located in a common location or may be distributed across multiple locations. The servers may provide web pages to the computing device 50, and the web pages may enable the user 51 of the computing device 50 to browse, search, discover, organize, access, use and/or play media objects in a web browser 71 provided by the computing device 50. The web pages may have embedded scripts and/or programs to facilitate these operations. For example, some or all of the web pages may have an embedded media player to allow audio media objects and/or audiovisual media objects t to be played in a web page.

Alternatively, the servers may communicate information to an application 81 executed by the computing device 50, and the information may enable the user 51 of the computing device 50 to browse, search, discover, organize, access, use and/or play media objects using the application 81 executed by the computing device 50. For example, the information may have and/or may be, text information, graphical information, search results, URLs, layout information, media content, and/or the like. Some or all of the information may be communicated from the media service 80 to the application 81 in response to requests, queries, messages and/or other communications sent from the application 81 to the media service 80. As a result, the application 81 may enable the user 51 of the computing device 50 to access media objects through the media service 80.

The media service 80 may have a page layout generation component 83 which may create visual information for presentation to the user 51 of the computing device 50. For example, the page layout generation component 83 may generate web pages for display in the web browser 71 provided by the computing device 50. As another example, the page layout generation component 83 may generate screens of visual information for display by the application 81 executed by the computing device 50. The web pages and/or the screens of visual information may support the various functions of the media service 80 described herein.

The media service 80 may maintain a user account 85 for each of the users of the media service 80. The user account 85 may have one or more records associated with the user to whom the user account 85 corresponds. For example, the user account 85 may have a User ID 86 for identification of the user to whom the user account 85 corresponds. As another example, the user account 85 may have access credentials to enable the user to access the media service 80 using the user account 85. As another example, the user account 85 may have lists of media objects 87, such as audio playlists and video playlists created by, shared to and/or generated for the user to whom the user account 85 corresponds. The user account 85 may be associated with billing information. For example, the user account 85 may have records to indicate whether the user has an up-to-date paid subscription which may be required for access to the media service 80. The media service 80 may provide a common search function which enables the user 51 to search multiple audio object databases in a single action.

The media service 80 may enable the user 51 to discover audio media objects available through the media service 80. The audio media objects may be provided directly by the media service 80; for example, the audio media objects may be stored in a first audio media object database 88 which may be part of the media service 80. Alternatively, the audio media objects may be provided by another source. For example, the audio media objects may be stored in a second audio media object database 92 which may not be a part of the media service 80 and/or may be associated with a media provider not affiliated with the media service 80. The second audio media object database 92 may be accessible to the media service 80 over the network 70. The media service 80 may provide a search function to enable the user 51 to browse, search, discover, organize, access, use and/or play media objects available from another media provider or from multiple media providers which are separate from the media service 80. As a result, the media service 80 may search one or more audio media object databases associated with the other media provider or the multiple media providers which are separate from the media service 80. Accordingly, the media service 80 may discover media objects based on search information provided by the user 51.

As previously set forth, the media service 80 may provide a common search function which enables the user 51 to search multiple audio object databases in a single action. For example, the common search function may enable the user 51 to search the first audio media object database 88 and the second audio media object database 92 in a single action.

In an embodiment, the media service 80 may provide audio media objects directly from the first audio media object database 88 of the media service 80 and may also provide the search function to access audio media objects from other providers, such as the audio media objects from the second audio media object database 92. The second audio media object database 92 may not be a part of the media service 80 and/or may be associated with a media provider not affiliated with the media service 80.

The media service 80 may enable the user 51 to organize audio media objects discovered through the media service 80 by creating lists of audio media objects, such as, for example, the list of audio media objects 11. For example, the media service 80 may enable the user 51 to create playlists which reference audio media objects discovered using the media service 80. The media service 80 may enable the user 51 to play the audio media objects using a list of audio media objects. For example, the user 51 may be able to play the audio media objects using the media playback element 65 of the computing device 50, and/or the user 51 may be able to play the audio media objects using the external rendering device 61, such as a DLNA compliant stereo device. The web browser 71 and/or the application 81 may provide controls for playing the audio media objects using the list of audio media objects provided by the media service 80. For example, the web browser 71 and/or the application 81 may enable the user 51 to create a playlist, to select a playlist for playback, to control playback position, to control the order in which the audio media objects are played, and/or the like. As a result, the audio media objects in the list of audio media objects may be played using the media playback element 65 of the computing device 50 and/or may be rendered on the external rendering device 61.

The web browser 71 and/or the application 81 may present a control for requesting creation of the list of audiovisual media objects 12 which correspond to the audio media objects in the list of audio media objects 11. The user 51 may invoke the control after creating, selecting, accessing, and/or using the list of audio media objects 11. As a result, the web browser 71 and/or the application 81 may communicate with the media service 80 through the network 70 to generate the list of audiovisual media objects 12.

The media service 80 may provide the list of audio media objects 11 to the list conversion engine 10. The list conversion engine 10 may analyze the list of audio media objects to obtain the metadata descriptive of the audio media objects in the list of audio media objects 11. Alternatively or additionally, the list conversion engine 10 may access the audio media objects to obtain the metadata. For example, the list conversion engine 10 may access the audio media objects in the first audio media object database 88, in the second audio media object database 92, and/or in additional audio media object databases not shown in FIG. 3c. Then, the list conversion engine 10 may use the metadata to search one or more available visual media object databases to identify visual media objects which correspond to the audio media objects in the list of audio media objects 11.

As shown in FIG. 3c, the list conversion engine 10 provided by the media service 80 may have access to a first visual media object database 89 which may have visual media objects provided directly by the media service 80. Further, the list conversion engine 10 provided by the media service 80 may have access to a second visual media object database 93 which may have visual media objects provided by a media provider separate from the media service 80. The list conversion engine 10 may search any number of visual media object databases which may be provided by the media service 80, may be separate from the media service 80, or may be a combination of both types of visual media object databases. In an embodiment, the first visual media object database 89 may be a database of professionally produced music videos, and/or the second visual media object database 93 may be a media sharing site having fan videos and/or digital photographs uploaded to the media sharing site by users of the media sharing site.

After identifying visual media objects which correspond to the audio media objects in the list of audio media objects 11, the list conversion engine 10 may generate the list of audiovisual media objects 12. To generate the list of audiovisual media objects 12, the list conversion engine 10 may employ any of the previously presented techniques for identifying, selecting and/or creating audiovisual media objects for inclusion in the list of audiovisual media objects 12.

For example, the list conversion engine 10 may select an audiovisual media object which corresponds to an audio media object and may include the selected audiovisual media object in the list of audiovisual media objects 12. As another example, the list conversion engine 10 may solicit user input to select an audiovisual media object from multiple audiovisual media objects corresponding to the audio media object. Then, the list conversion engine 10 may include the audiovisual media object selected by the user input in the list of audiovisual media objects 12. As another example, the list conversion engine 10 may create an audiovisual media object by combining one of the audio media objects with one or more visual media objects which correspond to the one of the audio media objects. Then, the list conversion engine 10 may include the created audiovisual media object in the list of audiovisual media objects 12. The list conversion engine 10 may combine such various techniques depending on the number and/or the type of visual media objects which correspond to each of the audio media objects in the list of audio media objects 11.

The list conversion engine 10 may generate the list of audiovisual media objects 12. Then, the media service 80 may make the list of audiovisual media objects 12 available to the user 51 using the web browser 71 and/or the application 81 executed by the computing device 50. For example, the media service 80 may provide a web page to the web browser 71 of the computing device 50 which may display the list of audiovisual media objects 12 as a video playlist. The computing device 50 may enable the user 51 to play the audiovisual media objects using the list of audiovisual media objects 12. As another example, the media service 80 may provide the list of audiovisual media objects 12 to the application 81 executed by the computing device 50. The application 81 may display the list of audiovisual media objects 12 to the user 51 and/or may enable the user 51 to play the audiovisual media objects using the list of audiovisual media objects 12.

The audiovisual media objects of the list of audiovisual media objects 12 may be rendered for the user 51 on the computing device 50. For example, the audiovisual media objects of the list of audiovisual media objects 12 may be rendered on the user interface 55, the media playback element 65, and/or the external rendering device 61. In an embodiment, the external rendering device 61 may be a DLNA-compatible television. In an embodiment, the audiovisual media objects of the list of audiovisual media objects 12 may be streamed to the computing device 50 from one or more remote content sources using the network 70.

In an embodiment, the audiovisual media objects of the list of audiovisual media objects 12 may be transmitted to the computing device 50 and/or a storage location accessible to the computing device 50 for playback by the computing device 50. The storage location may be, for example, the internal storage 58 and/or the external storage 60.

FIGS. 4a-4d generally illustrate a user interface 100 in embodiments of the present invention. The user interface 100 may be suitable for presentation on a mobile device 101 equipped with a touchscreen 102. The mobile device 101 may be the computing device 50 of FIGS. 3a-3c. The user interface 100 may utilize various well-known user interface conventions for touchscreen-equipped mobile devices, such as, for example, touchable buttons; selection of an item from a list of items; gestures, such as finger swipes and pinch-to-zoom; scrolling a list of items; automatic orientation adaptation in response to screen rotation; and/or the like. One skilled in the art will recognize various places in FIGS. 4a-4d where these and other well-known touchscreen user interface conventions may apply.

However, the present invention is not limited to the embodiments of the user interface 100 depicted in FIGS. 4a-4d. Moreover, the user interface 100 is not limited to a mobile device user interface. One skilled in the art will recognize that additional user interfaces with similar function may be developed for other devices, and such additional user interfaces may use the display conventions and user input facilities available on the other devices. For example, a corresponding user interface for a desktop PC may use pointer-based user input, such as user input provided by a mouse, and may use PC display conventions, such as a windowing system and drop-down menus. As another example, a corresponding user interface for a television set-top box may use "10-foot User Interface" conventions and/or may be controlled using an infra-red remote control associated with the television set-top box. As yet another example, a corresponding user interface provided by a web page may use typical visual and/or functional components of a web page, such as formatted text, borders, tables, forms, embedded images, links, active buttons, scripts, embedded media players, and/or the like. The present invention is not limited to the embodiments of the user interface 100 depicted in FIGS. 4a-4d.

FIG. 4a generally illustrates a first screen 111 of the user interface 100 in an embodiment of the present invention. The first screen 111 may display the list of audio media objects 11, such as, for example, a music playlist. The list of audio media objects 11 may have been created, edited, generated, accessed and/or used by the user of the mobile device 101. Alternatively, the list of audio media objects 11 may have been shared with the user of the mobile device 101 by another user and/or may have been provided by a media service. Techniques for creating, obtaining or sharing a list of audio media objects are well known in the art, and the present invention is not limited to a specific means by which the user may have created, discovered, selected or obtained the list of audio media objects 11.

The first screen 111 may have a list name 105 which may identify the list of audio media objects 11. In the example shown in FIG. 4a, the list name 105 is "Dory's Party Mix." The present invention is not limited to a specific embodiment of the list name 105, and the list name 105 may be any text, graphics and/or visual effect which identify the list of audio media objects 11. The first screen 111 may have an audio indication 106 which indicates that the first screen 111 displays a list of audio media. As shown in FIG. 4a, the audio indication 106 may be a graphical icon which may depict musical notes; however, the audio indication 106 may be text, may be a graphical symbol, may be an animation, and/or may be any suitable indication that the first screen 111 displays a list of audio media.

The first screen 111 may display the list of audio media objects 11. For each audio media object in the list of audio media objects 11, the first screen 111 may display information to identify and/or to describe the audio media object. The first screen 111 may display descriptive images 108, such as, for example, album cover images and/or photos of the artist or band associated with the audio media objects. In the example shown in FIG. 4a, the descriptive images 108 are shown as rectangles adjacent to the left side of the user interface 100. The first screen 111 may display metadata descriptive of the audio media objects in the list of audio media objects 11. As shown in FIG. 4a, the metadata may have a title, such as "I Feel Funky,", may have an artist name, such as "Bette Knottsbury," and/or may have a duration, such as "4:17," for each of the audio media objects in the list of audio media objects 11. The present invention is not limited to these examples for the metadata descriptive of the audio media objects, and the metadata may be any information descriptive of an audio media object.

The first screen 111 may present controls 107 for the user. For example, the controls 107 may have a "Manage Playlist" control 108 to manage the list of audio media objects 11, a "Listen" control 109 to listen to the audio media objects using the list of audio media objects 11, a "View Videos" control 110 to request the list of audiovisual media objects 12 based on the list of audio media objects 11, and/or other controls not shown in FIG. 4a. The "Manage Playlist" control 108 may enable the user to edit the list of audio media objects 11, delete the list of audio media objects 11, rename the list of audio media objects 11, select another list of audio media objects, create a new list of audio media objects, and/or the like. The user interface 100 may present another screen or a series of screens (not shown in FIGS. 4a-4d) which may enable the user to perform the various management functions invoked by the controls 107.

The "Listen" control 109 may enable the user to listen to the audio media objects in the list of audio media objects 11 using a media playback element 65 of the computing device 50 and/or using an external rendering device 61. In response to the user invoking the "Listen" control 109, the user interface 100 may present another screen or a series of screens (not shown in FIGS. 4a-4d) which provide the listening functions. For example, the user interface 100 may provide a screen which has playback controls to control the playback of the audio media objects in the list of audio media objects 11. The playback controls may have a "play" control, a "pause" control, a "stop" control, a control to skip forward to the next audio media object, a control to skip backward to the previous audio media object, a control to shuffle the playback order of the audio media objects, and/or the like.

The control to request the list of audiovisual media objects 12 based on the list of audio media objects 11 is depicted as the "View Videos" control 110 in FIG. 4a. The user may invoke the "View Videos" control 110, and, as a result, the list conversion engine 10 may be employed to generate the list of audiovisual media objects 12 using any of the various techniques described herein. The user interface 100 may then transition to a second screen 112, depicted in FIG. 4b, to display the list of audiovisual media objects 12.

Other controls which may be displayed by the user interface 100 but are not shown in FIG. 4a may be controls for previewing an audio media object from the list of audio media objects 11, viewing additional detailed metadata for an audio media object from the list of audio media objects 11, selecting a different list of audio media objects, exiting the application, and/or the like.

FIG. 4b generally illustrates the second screen 112 of the user interface 100 in an embodiment of the present invention. The second screen 112 may display the list of audiovisual media objects 12 generated based on the list of audio media objects 11. The user interface 100 may transition from the first screen 111 to the second screen 112 in response to selection of the "View Videos" control 110 in the first screen 111. For example, in response to selection of the "View Videos" control 110 in the first screen 111, the list conversion engine 10 may obtain the metadata descriptive of the audio media objects in the list of audio media objects 11, may use the metadata to search one or more visual media object databases to identify visual media objects which correspond to the audio media object, may identify visual media objects which correspond to the audio media objects in the list of audio media objects 11, and/or may create the list of audiovisual media objects 12. The list conversion engine 10 may obtain the metadata descriptive of the audio media objects in the list of audio media objects 11, may use the metadata to search one or more visual media object databases to identify visual media objects which correspond to the audio media object, may identify visual media objects which correspond to the audio media objects in the list of audio media objects 11, and/or may create the list of audiovisual media objects 12 without any additional user input subsequent to selection of the "View Videos" control 110.

The second screen 112 may have a list name 115 which may identify the list of audiovisual media objects 12. The list name 115 may be based on the list name 105 for the list of audio media objects 11 used to generate the list of audiovisual media objects 12. In the example shown in FIG. 4*b*, the list name 115 is "Dory's Party Mix." Alternatively, the list name 115 may be a default name, such as "New List," or may be a name entered by the user through an available text input method. The present invention is not limited to these examples for creating and/or obtaining the list name 115, and the list name 115 may be any text, graphics and/or visual effect which identify the list of audiovisual media objects 12.

The second screen 112 may have a video indication 116 which indicates that the second screen 112 displays a list of audiovisual media. As shown in FIG. 4*b*, the video indication 116 may be a graphical icon which may depict a movie camera and film; however, the video indication 116 may be text, may be a graphical symbol, may be an animation, and/or may be any suitable indication that the second screen 112 displays a list of audiovisual media.

The second screen 112 may display the list of audiovisual media objects 12 corresponding to the audio media objects in the list of audio media objects 11. For each audiovisual media object, the second screen 112 may display information to identify and/or to describe the audiovisual media object. The second screen 112 may display descriptive images 118 for the audiovisual media objects. For example, the second screen 112 may display sample video frames, thumbnail images, visualizations, album cover images, photos of an artist or band, and/or other imagery associated with and/or descriptive of the audiovisual media objects in the list of audiovisual media objects 12. In the example shown in FIG. 4*b*, the descriptive images 118 are shown as rectangles adjacent to the left side of the user interface 100.

The second screen 112 may display metadata descriptive of the audiovisual media objects. As shown in FIG. 4*b*, the metadata may have a title, such as "I Feel Funky," may have an indication of the object type, such as "Music Video," and/or may have a duration, such as "4:37" for each of the audiovisual media objects in the list of audiovisual media objects 12. The present invention is not limited to these examples for the metadata descriptive of the audiovisual media objects, and the metadata may be any information descriptive of an audiovisual media object.

The second screen 112 may present an audio-only indication 120 to indicate an audio media object lacking a corresponding audiovisual media object. For example, the audio-only indication may be presented if the list conversion engine 10 failed to identify a visual content object corresponding to one or more of the audio media objects in the list of audio media objects 11. As shown in FIG. 4*b*, the audio-only indication 120 may be a graphical representation of musical notes and/or the text "Music Only." The audio-only indication 120 may be any text, graphics and/or visual effect. The audio-only indication 120 may inform the user that the associated audio media object in the list of audiovisual media objects 12 will be rendered using the original audio media object with no visual component, or using the original audio media object combined with a simple visual component, such as a static image, a static display of metadata, and/or a music visualization animation generated from the original audio media object. The technique for rendering an audio-only media object may vary based on the embodiment.

The second screen 112 may present controls 121 for the user. For example, the controls 121 may have a "Save Playlist" control 122 to save the list of audiovisual media objects 12, a "Watch" control 123 to play back the audiovisual media objects using the list of audiovisual media objects 12, a "Back to Music" control 124 to return to the corresponding list of audio media objects 11, and/or other controls not shown in FIG. 4*b*. The "Save Playlist" control 122 may enable the user to save the list of audiovisual media objects 12 as a video playlist. In addition, the "Save Playlist" control 122 may expose additional management functions applicable to saved video playlists. The user interface 100 may present another screen or a series of screens (not shown in FIG. 4*b*) which may enable the user to save the list of audiovisual media objects 12 and/or perform the additional management functions.

The "Watch" control 123 may enable the user to view the audiovisual media objects in the list of audiovisual media objects 12 using the media playback element 65 of the computing device 50 and/or using the external rendering device 61. For example, the "Watch" control 123 may transition the user interface 100 to a video playback screen, such as a fourth screen 114 as illustrated in FIG. 4*d*.

Referring again to FIG. 4*b*, the "Back to Music" control 124 may prompt the user interface 100 to display a screen displaying the list of audio media objects 11. For example, the user interface 100 may display the first screen 111 in response to selection of the "Back to Music" control 124.

The second screen 112 may have one or more of an "access alternative objects" control 125 for accessing alternative media objects associated with the audiovisual media objects in the list of audiovisual media objects 12. In the example illustrated in FIG. 4*b*, the "access alternative objects" control 125 is displayed next to the "Two's the Oddest" music video to indicate that alternative audiovisual media objects may be available. The "access alternative objects" control 125 may indicate that the alternative audiovisual media objects may be substituted for the "Two's the Oddest" music video in the list of audiovisual media objects 12. The user may invoke the "access alternative objects" control 125 to access the alternative audiovisual media objects. As a result, the user interface 100 may transition to a third screen 113 as illustrated in FIG. 4*c*.

Other controls not shown in FIG. 4*b* may be controls for previewing an audiovisual media object from the list of audiovisual media objects 12, viewing additional detailed metadata for an audiovisual media object in the list of audiovisual media objects 12, exiting the application, and/or the like. The additional detailed metadata may have any of the descriptive metadata fields previously introduced. In an embodiment, the additional detailed metadata may have the source of the audiovisual media object, information about the creation of the audiovisual media object from one or more visual media objects, information about the audio media object to which the audiovisual media object corresponds, and/or the like.

FIG. 4*c* illustrates the third screen 113 of the user interface 100 in an embodiment of the present invention. The third screen 113 may display a list of alternative audiovisual media objects 13 and/or may enable the user to select one of the alternative audiovisual media objects for inclusion in the list of audiovisual media objects 12.

The third screen 13 may display instructions 130 for the user. The instructions 130 may instruct the user to select an audiovisual media object from the list of alternative audiovisual media objects 13 displayed by the user interface 100. As shown in FIG. 4c, the instructions 130 may display information about the audio media object to which the alternative audiovisual media objects correspond. As shown in the example depicted in FIG. 4c, the instructions 130 may display a descriptive image, shown as an empty rectangle in FIG. 4c; a song title, namely "Two's the Oddest"; an artist name, namely "Garbage Boys"; and a duration, namely "4:29." As shown in FIG. 4b, the instructions 130 may provide an audio indication that the media object described in the instructions 130 is an audio media object. The audio indication shown in FIG. 4b is a graphical depiction of musical notes. The present invention is not limited to these examples, and the present invention is not limited to a specific embodiment of the instructions 130.

The third screen 113 may display the list of the alternative audiovisual media objects 13. For each of the alternative audiovisual media objects, the third screen 113 may display descriptive information similar to that previously described for FIGS. 4a and 4b. In the example shown in FIG. 4c, the list of alternative audiovisual media objects 13 has a music video with the title "Two's the Oddest," a first fan video with the title "Garbage Boys," and a second fan video with the title "My Favorite Garbage." For example, the list conversion engine 10 may have found the music video by searching a visual media object database associated with a provider of professionally produced music videos, and the list conversion engine 10 may have found the first fan video and the second fan video by searching a visual media object database associated with a video sharing site.

The third screen 113 may identify a currently selected audiovisual media object 131 in the list of alternative audiovisual media objects 13. For example, the currently selected audiovisual media object 131 may be highlighted, may be displayed brightly, may be circled, may have a distinguishing symbol, and/or the like. The currently selected audiovisual media object 131 may be the alternative audiovisual media object currently included in the list of audiovisual media objects 12. The third screen 113 may enable the user to select another alternative audiovisual media object from the list of alternative audiovisual media objects 13. As a result, the alternative audiovisual media object selected by the user may become the currently selected audiovisual media object 131 and/or may be subsequently included in the list of audiovisual media objects 13.

The list conversion engine 10, the application 72,81, and/or the media service 80 may record the alternative audiovisual media object selections made by the user 51, and may combine such records with records of other users. Based on the combined records, the list conversion engine 10, the application 72,81, and/or the media service 80 may determine which of the alternative audiovisual media objects is most often selected by users. Then, this determination may be used by the list conversion engine 10 to select the default audiovisual media object for inclusion in the list of audiovisual media objects 12 when the same audio media object is later presented to the list conversion engine 10 in a list of audio media objects 11. In a similar fashion, the list conversion engine 10 may use the combined records to order the various alternative audiovisual media objects in the list of alternative audiovisual media objects 13.

The third screen 113 may present controls 135 for the user. For example, the controls 135 may include a "Preview control 136 to preview one or more of the alternative audiovisual media objects, a "DONE" control 137 to exit the third screen 113 and/or incorporate the currently selected audiovisual media object 131 into the list of audiovisual media objects 12, a "Cancel" control 138 to exit the third screen 113 without modifying the list of audiovisual media objects 12, and/or the like. The "Preview" control 136 may render the currently selected audiovisual media object 131 using the media playback element 65 of the computing device 50.

In an embodiment, selection of an alternative audiovisual media object in the third screen 113 may cause the selected alternative audiovisual media object to replace a corresponding audiovisual media object in the list of audiovisual media objects 12. In another embodiment, the third screen 113 may enable more than one alternative audiovisual media object to be selected by the user. As a result, more than one alternative audiovisual media object may be added to the list of audiovisual media objects 12.

FIG. 4d generally illustrates a fourth screen 114 of the user interface 100 in an embodiment of the present invention. The fourth screen 114 may enable the user to play back the audiovisual media objects using the list of audiovisual media objects 12. The user interface 100 may transition to the fourth screen in response to selection of the "Watch" control 123 in the second screen 112.

The fourth screen 114 may have a media playback area 140 for rendering a currently playing media object 145 on the display screen of the computing device 50, such as, for example, the touchscreen 100 of the mobile device 101. As shown in FIG. 4d, the media playback area 140 may be a full-screen media playback area. For example, the currently playing media object 145 may be played using the full screen size, and/or controls, indications and/or other user interface elements may be superimposed over the currently playing media object 145. The controls, the indications and/or the other user interface elements may appear when necessary, such as, for example, when the user touches the touchscreen 100. Moreover, the controls, indications, and/or other user interface elements may disappear if not in use.

One skilled in the art will recognize that other media playback configurations are possible; for example, the display screen may be partitioned into the media playback area 140 and a separate area for the controls, the indications and/or the other user interface elements. The present invention is not limited to the full screen media playback area depicted in FIG. 4d.

The fourth screen 114 may display media information 146 which may provide descriptive information for the list of audiovisual media objects 12 and/or the currently playing media object 145. As shown in FIG. 4d, the media information may have the list name 115 for the list of audiovisual media objects 12, namely "Dory's Party Mix," and/or the title of the currently playing media object, namely "I Feel Funky." The media information 146 may have additional descriptive information for the list of audiovisual media objects 12. For example, the media information 146 may display detailed information for the currently playing media object 145, such as an artist name, a media provider name, an object type, and/or a genre. As another example, the media information 146 may display information about other audiovisual media objects in the list of audiovisual media objects 12, such as the title of the next audiovisual media object to be played from the list of audiovisual media objects 12.

The fourth screen 114 may provide media playback controls 147 which may enable the user to control the playback of media objects using the list of audiovisual media objects 12. As shown in FIG. 4d, the media playback controls 147 may display a current playback position, namely "0:53"; a total playback duration, namely "4:37"; a visual progress bar; and/or a button to toggle playback state between a playing state and a paused state. The media playback controls 147 may have other controls not shown in FIG. 4d; for example, the media playback controls 147 may have a fast forward control, a rewind control, a stop control, a control to skip backward to the previous media object in the list of audiovisual media objects 12, a control to skip forward to the next media object in the list of audiovisual media objects 12, a control to shuffle the playback order of the list of audiovisual media objects 12, and/or the like.

The fourth screen 114 may display the list of audiovisual media objects 12. As shown in FIG. 4d, the list of audiovisual media objects 12 may be displayed using descriptive images 148. The descriptive images 148 may represent the currently playing media object 145, shown as the larger rectangle in the bottom left of the user interface 100 in FIG. 4d, and/or the other media objects in the list of audiovisual media objects 12, shown as the smaller rectangles arrayed along the bottom of the user interface 100. As a result, the user may visualize the list of audiovisual media objects 12, may determine the position of the currently playing media object 145 in the list of audiovisual media objects 12, and/or may select any of the other media objects to jump to a new playback position in the list of audiovisual media objects 12.

The fourth screen 114 may display an external rendering control 150. The external rendering control 150 may enable the user to render the currently playing media object 145 and/or the other media objects in the list of audiovisual media objects 12 on the external rendering device 61, such as a DLNA-compatible television device. As shown in FIG. 4d, the external rendering control 150 may be a touchable button which may be invoked to send the currently playing media object 145 to a television device. For example, the user may tap the touchable button to begin sending the currently playing media object 145 to the television device and/or to stop sending the currently playing media object 145 to the television device. The fourth screen 114 may present additional controls and/or control mechanisms to select a new rendering device for external rendering. For example, the user may "long press" the touchable button to access a list of available rendering devices and/or to select an alternative rendering device for rendering the audiovisual media objects in the list of audiovisual media objects 12.

In an embodiment, the user may invoke the "View Videos" control 110 for the list of audio media objects 11. As a result, the corresponding list of audiovisual media objects 12 may be generated and/or may begin playing in the user interface 100. For example, selection of the "View Videos" control 110 on the first screen 111 may transition the user interface 100 to the fourth screen 114 with the fourth screen rendering the list of audiovisual media objects 12 in the media playback area 140.

In an embodiment, the user may invoke the "View Videos" control 110 for the list of audio media objects 11. As a result, the corresponding list of audiovisual media objects 12 may be generated and/or may begin rendering on the external rendering device 61. For example, selection of the "View Videos" control 110 on the first screen 111 may initiate rendering of the list of audiovisual media objects 12 on the external rendering device 61.

Hereafter, an example is described to generally illustrate encoding of alternative audiovisual media objects in a playlist file. More specifically, the following example describes alternative audiovisual media objects encoded in an M3U playlist file using comment fields. In standard M3U format, the comment fields are proceeded with the pound character, namely "#". Therefore, an application which supports M3U playlist format but which is not capable of supporting the alternative audiovisual media objects may ignore the comment fields in this example. However, an application which is capable of supporting the alternative audiovisual media objects may recover the list of alternative audiovisual media objects from the comment fields, and may, for example, enable the user to select one of the alternative media objects for inclusion in the list of audiovisual media objects 12.

The following example is an M3U file which represents the list of videos for "Dory's Party Mix" from the second screen 112 of the user interface 100 generally illustrated in FIG. 4b.

http://www.firstprovider.com/videos/I_feel_funky.mp4
http://www.youtube.com/watch?v=GkOPuZmTzQV
http://www.firstprovider.com/videos/Twos_the_oddest.mp4
M3UALT:http://www.fanshare.com/uploads/Garbage_Boys.flv
M3UALT:http://www.fanshare.com/uploads/My_Favorite_Garbage.flv
http://www.mediaservice.com/custom-objs/zing_zang_zowie.ogg
http://www.mediaservice.com/custom-objs/planet_sunday_viz.ogg The first line of the above M3U example represents the "I Feel Funky" music video available from a first provider which may provide professionally produced music video content. The second line of the above M3U example represents the "Bertha Ford Tour" YouTube video available from the YouTube video sharing site. The third line of the above M3U example represents the "Two's the Oddest" music video available from the first provider. The fourth line and the fifth line of the above M3U example represent the alternative audiovisual media objects available from a fan video site, www.fanshare.com. These alternative audiovisual media objects correspond to the "Garbage Boys" fan video and the "My Favorite Garbage" fan video from the third screen 113 of the user interface 100 generally illustrated in FIG. 4c.

The sixth line of the above M3U example represents the "Zing Zang Zowie" music slideshow object. The list conversion engine 10 of www.mediaservice.com may have created this audiovisual media object by combining the original "Zing Zang Zowie" audio media object from the list of audio media objects 11 displayed in FIG. 4a with a set of corresponding visual media objects, such as digital photographs identified by the list conversion engine 10. The list conversion engine 10 of www.mediaservice.com may have encoded the result as an audiovisual file in Ogg format.

The seventh line of the above M3U example represents the "Planet Sunday" audio-only media object. The list conversion engine 10 of www.mediaservice.com may have created this audio-only media object by combining the original "Planet Sunday" audio media object with a music visualization animation generated from the original "Planet Sunday" audio media object. The list conversion engine 10 of www.mediaservice.com may have encoded the result as an audiovisual file in Ogg format.

As previously noted, an application which is capable of supporting the alternative audiovisual media objects may recover the list of alternative audiovisual media objects 13 from the comment fields of the above M3U example. The application may, for example, enable the user to select one of the alternative media objects for inclusion in the list of audiovisual media objects 12. As a result, the application may create a modified M3U file which substitutes the selected alternative audiovisual media object for the "Two's the Oddest" music video. The resulting modified M3U file is illustrated in the following M3U example:

http://www.firstprovider.com/videos/I_feel_funky.mp4
http://www.youtube.com/watch?v=GkOPuZmTzQV
http://www.fanshare.com/uploads/My_Favorite_Garbage.flv
M3UALT:http://www.fanshare.com/uploads/Garbage_Boys.flv
M3UALT:http://www.firstprovider.com/videos/Twos_the_oddest.mp4
http://www.mediaservice.com/custom-objs/zing_zang_zowie.ogg
http://www.mediaservice.com/custom-objs/planet_sunday_viz.ogg The preceding example describes alternative audiovisual media objects encoded in an M3U playlist file using comment fields. However, other techniques may use a playlist file to specify the multiple audiovisual media objects corresponding to an audio media object. For example, a new playlist file format may be created and/or an existing playlist file format may be extended to include fields for representing the multiple audiovisual media objects corresponding to an audio media object. The present invention is not limited to the specific embodiment of the preceding M3U playlist file example.

As a result of the system and method described herein, a user of a computing device may request generation of the list of audiovisual media objects 12 which correspond to the audio media objects in the list of audio media objects 11. The list of audio media objects 11 may be provided to the list conversion engine 10 which may discover, create, and/or obtain audiovisual media objects which correspond to the audio media objects in the list of audio media objects 11. For each audio media object in the list of audio media objects 11, the list conversion engine 10 may identify a corresponding audiovisual media object from one of the visual media object databases and/or may create a corresponding audiovisual media object based on a combination of the audio media object and an available visual media object. The list of audiovisual media objects 12 may be provided and/or displayed to the user, and the user may use the list of audiovisual media objects 12 to have playback of the audiovisual media objects.

Various changes and modifications to the presently preferred embodiments described herein will be apparent to those skilled in the art. Such changes and modifications may be made without departing from the spirit and scope of the present invention and without diminishing its attendant advantages. Such changes and modifications are covered by the appended claims.

We claim:

1. A method for using a list of two or more audio media objects to create a list of audiovisual media objects, the method comprising the steps of:
    analyzing the list of audio media objects to obtain metadata descriptive of the audio media objects;
    searching one or more visual media object databases using the metadata wherein each of the visual media object databases provides access to visual media objects which encode visual content;
    identifying a set of visual media objects wherein each of the visual media objects in the set corresponds to one of the audio media objects in the list of audio media objects wherein the set of visual media objects is identified based on the searching step without user input selecting the visual media objects in the set;
    using the set of visual media objects to create the list of audiovisual media objects wherein each of the audiovisual media objects referenced by the list of audiovisual media objects corresponds to one of the audio media objects in the list of audio media objects;
    playing the audio media objects using the list of audio media objects wherein a user of a computing device controls the playing of the audio media objects using a user interface of the computing device;
    accepting user input on the computing device wherein the list of audiovisual media objects is created in response to the user input;
    and playing the audiovisual media objects of the list of audiovisual media objects using a rendering device which is a different device than the computing device wherein the computing device stops playing the audio media objects and instructs the rendering device to begin playing the audiovisual media objects without additional user input requesting playback of the audiovisual media objects subsequent to the user input which prompts creation of the list of audiovisual media objects.

2. Claim 1 further comprising the step of:
    accepting user input on a computing device from a user of the computing device wherein the list of audiovisual media objects is created in response to the user input.

3. The method of claim 1 wherein each of the audio media objects referenced by the list of audio media objects corresponds to one of the audiovisual media objects in the list of audiovisual media objects.

4. The method of claim 1 wherein the step of analyzing the list of audio media objects comprises the steps of:
    identifying a first audio media object referenced by the list of audio media objects;
    accessing the first audio media object; and
    extracting a metadata field from the first audio media object wherein the metadata field is included in the metadata used in the searching step.

5. The method of claim 1 wherein one of the one or more visual media object databases is a database of professionally produced music videos.

6. The method of claim 1 wherein one of the one or more visual media object databases is a video sharing service which provides access to fan videos.

7. The method of claim 1 wherein one of the one or more visual media object databases is a database which provides access to digital photographs uploaded by users.

8. The method of claim 1 further comprising the step of:
    using the metadata of a first audio media object referenced by the list of audio media objects to identify a first visual media object and a second visual media object which correspond to the first audio media object wherein the first visual media object is available from a first visual media object database and the second visual media object is available from a second visual media object database wherein the first visual media object is used to create the list of audiovisual media and the second visual media object is not used to create the list of audiovisual media objects based on a predetermined preference for the first visual media object database over the second visual media object database.

9. The method of claim 1 wherein one of the audiovisual media objects in the list of audiovisual media objects is one of the visual media objects in the set of visual media objects.

10. The method of claim 1 wherein each of the audio media objects referenced by the list of audio media objects does not encode visual content.

11. The method of claim 1 further comprising the step of:
    obtaining the audiovisual media objects referenced by the list of audiovisual media objects wherein the computing device uses the list of audiovisual media objects to obtain the audiovisual media objects and further wherein the computing device stores the audiovisual media objects on a storage medium after obtaining the audiovisual media objects.

12. The method of claim 1 wherein a first audiovisual media object in the list of audiovisual media objects is obtained from a first content provider and further wherein a second audiovisual media object in the list of audiovisual media objects is obtained from a second content provider which is a different content provider than the first content provider.

13. The method of claim 1 wherein the list of audiovisual media objects is provided to the user of the computing device as a playlist file.

14. The method of claim 1 further comprising the steps of:
displaying the list of audiovisual media objects to a user of a computing device;
accepting user input on the computing device after displaying the list of audiovisual media objects; and
playing the audiovisual media objects using the list of audiovisual media objects wherein playing the audiovisual media objects is initiated in response to the user input and further wherein playing the audiovisual media objects involves rendering the audiovisual media objects using one of the computing device and an external rendering device.

15. The method of claim 1 further comprising the step of:
using a web page to upload the list of audio media objects to a video media provider located remotely relative to the computing device wherein the video media provider creates the list of audiovisual media objects.

16. The method of claim 1 further comprising the step of:
creating the list of audio media objects using a web page provided by an online content service wherein the online content service uses the list of audio media objects to create the list of audiovisual media objects.

17. The method of claim 1 further comprising the step of:
storing the list of audiovisual media objects in a playlist file having a first audiovisual media object corresponding to a first audio media object referenced by the list of audio media objects wherein an alternative audiovisual media object corresponding to the first audio media object is encoded using comment fields in the playlist file.

18. The method of claim 1 further comprising the steps of:
combining audio content from one of the audio media objects referenced by the list of audio media objects with visual content from at least one of the visual media objects from the set of visual media objects to produce a new audiovisual media object; and
including a reference to the new audiovisual media object in the list of audiovisual media objects.

19. The method of claim 1 wherein the audio media objects referenced by the list of audio media objects are digital music tracks.

20. The method of claim 19 wherein the audiovisual media objects referenced by the list of audiovisual media objects are music videos which correspond to the digital music tracks.

21. A system for using a list of audio media objects to create a list of audiovisual media objects, the system comprising:
a computing device which plays audio media objects referenced by the list of audio media objects wherein a user of the computing device inputs a request for creation of the list of audiovisual media objects using a user interface provided by the computing device;
a list conversion engine which responds to the request by analyzing the list of audio media objects to obtain metadata descriptive of the audio media objects wherein the list conversion engine uses the metadata to search a visual media object database which provides access to visual media objects which encode visual content;
and a set of visual media objects identified by the list conversion engine wherein each of the visual media objects in the set corresponds to one of the audio media objects in the list of audio media objects and further wherein the list of audiovisual media objects is created by the list conversion engine using the set of visual media objects wherein each of the audiovisual media objects in the list of audiovisual media objects corresponds to one of the audio media objects referenced by the list of audio media objects;
further comprising playing the audio media objects using the list of audio media objects wherein a user of the computing device controls the playing of the audio media objects using the user interface of the computing device;
accepting user input on the computing device wherein the list of audiovisual media objects is created in response to the user input;
and playing the audiovisual media objects of the list of audiovisual media objects using a rendering device which is a different device than the computing device wherein the computing device stops playing the audio media objects and instructs the rendering device to begin playing the audiovisual media objects without additional user input requesting playback of the audiovisual media objects subsequent to the user input which prompts creation of the list of audiovisual media objects.

22. The system of claim 21 wherein the list conversion engine is at least partially provided by an application executed by the computing device.

23. The system of claim 21 wherein the list conversion engine is accessed by the computing device using a network to which the computing device is connected.

24. The system of claim 21 further comprising:
a web page provided by a media service remotely located relative to the computing device wherein the computing device accesses the list conversion engine over a network using the web page provided by the media service.

25. The system of claim 21 wherein the user of the computing device uses the list of audiovisual media objects to render the audiovisual media objects referenced by the list of audiovisual media objects on a DLNA-compliant television in communication with the computing device over a home network.

26. A method for using a list of two or more audio media objects to create a list of two or more audiovisual media objects, the method comprising the steps of:
for each audio media object in the list of audio media objects:
obtaining metadata descriptive of the audio media object;
searching one or more visual media object databases using the metadata, wherein the searching identifies a set of visual media objects which correspond to the audio media object;
and determining an audiovisual media object for inclusion in the list of audiovisual media objects wherein the audiovisual media object is determined based on examining properties of the visual media objects which correspond to the audio media object;
creating a list of audiovisual media objects wherein the list references each of the audiovisual media objects determined in the determining step;
and displaying the list of audiovisual media objects to a user of a computing device;

further comprising playing the audio media objects using the list of audio media objects wherein a user of a computing device controls the playing of the audio media objects using a user interface of the computing device;

accepting user input on the computing device wherein the list of audiovisual media objects is created in response to the user input;

and playing the audiovisual media objects of the list of audiovisual media objects using a rendering device which is a different device than the computing device wherein the computing device stops playing the audio media objects and instructs the rendering device to begin playing the audiovisual media objects without additional user input requesting playback of the audiovisual media objects subsequent to the user input which prompts creation of the list of audiovisual media objects.

27. The method of claim 26 wherein the obtaining step analyzes a playlist file to extract the metadata from the playlist file.

28. The method of claim 26 wherein the obtaining step examines at least one audio media object to extract the metadata from the audio media object.

29. The method of claim 26 wherein the list of audio objects references N audio objects wherein the list of audiovisual objects references N audiovisual objects wherein for each I in [1 . . . N], the Ith audiovisual object in the list of audiovisual objects corresponds to the Ith audio object in the list of audio objects.

30. The method of claim 26 further comprising the step of:
presenting within the displayed list an interactive control associated with a first audiovisual media object of the list of audiovisual media objects wherein the interactive control allows the user to access a list of alternative audiovisual media objects and to select one of the alternative audiovisual media objects to replace the first audiovisual media object in the list of audiovisual media objects.

31. The method of claim 26 wherein the determining step for at least one of the audio media objects involves selecting one of the visual media objects to be the audiovisual media object for inclusion in the list of audiovisual media objects.

32. The method of claim 26 wherein the examined properties include at least one of a number of times the visual media object has been viewed and a rating for the visual media object.

33. The method of claim 26 wherein the determining step for at least one of the audio media objects involves detecting that a first visual media object has a restriction indication and selecting the first visual media object to be the audiovisual media object for inclusion in the list of audiovisual media objects at least partly on the basis of detecting the restriction indication.

34. The method of claim 26 wherein the determining step for at least one of the audio media objects involves combining visual content from at least one of the visual media objects with audio content from the audio media object to produce a new audiovisual media object wherein the new audiovisual media object is the audiovisual media object for inclusion in the list of audiovisual media objects.

35. The method of claim 26 wherein the determining step for at least one of the audio media objects involves processing audio content of the audio media object to produce a visualization animation for the audio media object and creating a new audiovisual media object based on the visualization animation wherein the new audiovisual media object is the audiovisual media object for inclusion in the list of audiovisual media objects.

36. The method of claim 26 wherein the determining step for at least one of the audio media objects involves creating an image which displays text information descriptive of the audio media object and combining the image with audio content from the audio media object to create a new audiovisual media object wherein the new audiovisual media object is created based on determining that the set of visual media objects which correspond to the audio media object is an empty set.

* * * * *